United States Patent [19]

Hirota et al.

[11] 4,180,636

[45] Dec. 25, 1979

[54] PROCESS FOR POLYMERIZING OR CO-POLYMERIZING PROPYLENE

[75] Inventors: Kiwami Hirota; Hideki Tamano; Shintaro Inazawa, all of Oita, Japan

[73] Assignee: Showa Denko Kabushiki Kaisha, Tokyo, Japan

[21] Appl. No.: 809,873

[22] Filed: Jun. 24, 1977

[30] Foreign Application Priority Data

| Jun. 24, 1976 | [JP] | Japan | 51-73830 |
| Jun. 28, 1976 | [JP] | Japan | 51-75427 |
| Jun. 30, 1976 | [JP] | Japan | 51-76533 |
| Jul. 6, 1976 | [JP] | Japan | 51-79455 |
| Jul. 27, 1976 | [JP] | Japan | 51-88708 |
| Aug. 9, 1976 | [JP] | Japan | 51-93948 |
| Aug. 10, 1976 | [JP] | Japan | 51-94440 |

[51] Int. Cl.$^2$ .................. C08F 4/02; C08F 10/06
[52] U.S. Cl. .................. 526/125; 252/429 B; 252/429 C; 526/143; 526/351; 526/906
[58] Field of Search .................. 252/429 B, 429 C; 526/125, 143

[56] References Cited

U.S. PATENT DOCUMENTS 3,642,746  2/1972  Kashiwa et al. .................. 526/125

FOREIGN PATENT DOCUMENTS 2230672 12/1972 Fed. Rep. of Germany .......... 526/125
2504036  8/1975 Fed. Rep. of Germany .......... 526/125

*Primary Examiner*—Edward J. Smith
*Attorney, Agent, or Firm*—Sughrue, Rothwell, Mion, Zinn and Macpeak

[57] ABSTRACT

A process for polymerizing or co-polymerizing propylene in the presence of a catalyst consisting essentially of (A) a solid catalyst component which is prepared by contacting (1) a copulverized material obtained by copulverizing a magnesium dihalide compound together with an acyl halide with (2) a mixture or addition-reaction product of a tetravalent titanium compound containing at least one halogen atom with at least one electron donor compound selected from the group consisting of organic compounds containing a P—O bond, organic compounds containing an Si—O bond, ether compounds, nitrite ester compounds, sulfite ester compounds, alcohol compounds, phenol compounds and naphthol compounds, (B) a trialkyl aluminum compound, and (C) a carboxylic acid ester compound.

30 Claims, 8 Drawing Figures

PROCESS FOR POLYMERIZING OR CO-POLYMERIZING PROPYLENE

BACKGROUND OF THE INVENTION

1. Field of the Invention

This invention relates to a process for polymerizing or co-polymerizing propylene in the presence of a novel catalyst system.

2. Description of the Prior Art

It is well known that catalyst systems obtained from halide compounds of transition metals (generally titanium trichloride) and organometallic compounds (generally organoaluminum compounds) are suitable as polymerization catalysts for preparing polymers of olefins (especially propylene). Polymers prepared with such catalysts, however, do not have entirely satisfactory stereoregularity. Hence, the resulting polymers have relatively high amorphous contents, and their mechanical properties are inferior. Therefore, a step of removing the amorphous portion is required after polymerization, and in this case the degree of effective utilization of the starting olefins is reduced. Furthermore, these catalysts have low polymerization activities, and the polymers obtained with the catalyst contain so much catalyst residue that, it is necessary to remove it from the resulting polymer.

Many suggestions have therefore been made for catalysts which can afford highly stereoregular polymers. One of the coinventors of the present invention already suggested a catalyst system prepared from titanium trichloride or an eutectic mixture of it with aluminum chloride treated by contact with an acyl halide, and an organoaluminum compound (Japanese Laid-Open Patent Publication No. 26487/72). This catalyst system has greatly improved polymerization activity and stereospecificity, but the activity is still not sufficient as to permit the omission of a step of removing the catalyst residue from the polymer.

On the other hand, various methods have been suggested for supporting a transition metal compound (mainly a titanium compound) on halide compound of a divalent metal, Mg and Mn, (to be referred to as 'MX$_2$'). In recent years, it has been suggested to perform this supporting by first treating MX$_2$ with an electron donor compound (e.g., by copulverization) and then treating it with a transition metal compound (with or without another electron donor compound), or by simultaneously treating MX$_2$, a transition metal compound and an electron donor compound.

Typical examples of these methods include:

(A) a method which comprises pre-treating MX$_2$ with an organic acid ester and a halogenated silicate were a polysiloxane, and then with a transition metal compound and an organic acid ester (Japanese Laid-Open Patent Publication Nos. 108385/75, 20297/76, 28189/76, 92885/76, and 24293/77), (B) a method which comprises pre-treating MX$_2$ with a ketone, an aldehyde, an alcohol or the like, and then reacting the product with a titanium compound (Japanese Laid-Open Patent Publications Nos. 90687/74, 119980/74, and 8238/76), (C) a method which comprises reacting an organo magnesium compound with an Si-containing compound, and then treating the pre-treated product with a transition metal compound (Japanese Laid-Open Patent Publication No. 133489/74), (D) a method which comprises pre-treating MX$_2$ with an electron donor compound and then treating with a transition metal compound (with or without an Si or Sn halide compound) (Japanese Laid-Open Patent Publications Nos. 88983/74, 51378/74, 72383/74, 21989/75, and 13492/77), (E) a method which comprises copulverizing MX$_2$, a transition metal compound and a silicon-containing organic compound (Japanese Laid-Open Patent Publications Nos. 86482/74, 55385/76, 55386/76, 55387/76, and 28889/76), (F) a method which comprises copulverizing MX$_2$, a transition metal compound and an alcohol, ester, ketone, aldehyde or the like (Japanese Laid-Open Patent Publication No. 55388/76), (G) a method which comprises preparing a catalyst made from MX$_2$ and a transition metal compound which has a surface of more than 3 m$^2$/g or whose X-ray diffraction spectrum is broader than that of non-activated MX$_2$ and a transition metal compound (Japanese laid-open patent publication) Nos. 9342/72 and 16986-8/73), and (H) a method which comprises supporting a titanium compound on MX$_2$ pretreated with an electron donor compound, and then treating the product with an organic acid ester (Japanese Laid-Open Patent Publication No. 57789/76).

The catalyst systems obtained in these known methods are mainly a combination of an organo aluminum compound (with or without an electron donor compound) and a complex compound in which either a magnesium compound or a titanium compound is treated with an electron donor compound. But, any of these catalyst systems (particularly, in polymerization of propylene) are quite unsatisfactory in crystallinity of polymer. That is, the crystallinity (H.R.) as seen in the examples of these prior arts is in the range of 87 to 93% in terms of H.R. value taking into consideration the amount of non-crystalline polymers dissolved in the polymerization solvent. Further, in the prior art, hydrogen (as a chain transfer agent) is not used in the polymerization. When it is used in order to obtain a polymer which has a practical M.F.I. value (i.e., 1 to 20 g/10 min.), the H.R. value is reduced by 2 to 5%. Thus, when polypropylene is produced by the catalyst as proposed above, and non-crystalline polymers are not removed at all their practical mechanical properties of the resulting polymer are quite unsatisfactory.

In addition, these known methods do not at all suggest a method as in the present invention in which a mixture or a reaction product of a titanium compound and an electron donor compound is supported on a magnesium dihalide compound copulverized with an acyl halide, and the resultant is then activated with an organoaluminum compound an electron donor compound. It is an unexpected and excellent effect that in the practical MFI range, the H.R. value of the polymer produced with the thus obtained catalyst exhibits 94 to 98%. It is therefore not too much to say that the production of polypropylene having the same practical properties as in commercially available polypropylene has first become possible by the process of the present invention without removing its catalyst residue and amorphous portion.

It is believed that a catalyst system prepared from a solid component resulting from the supporting of a titanium compound on a magnesium halide and an organoaluminum compound (to be referred to as "catalyst system A") has higher polymerization activity than the conventional catalyst systems, and can possibly omit a process to remove the catalyst residue from the resulting polymer. However, the resulting polymer has a relatively low crystallinity, and without removing an amorphous polymer, it does not exhibit satisfactory properties in practical use. Furthermore, since the polymerization activity of this catalyst system per unit amount of the carrier is not high enough, a relatively large quantity of the magnesium dihalide remains in the resulting polymer, and will cause the coloration of the product or the corrosion of the polymerization apparatus. Much difficulty is encountered in the production of polymers, too, because the powdery polymer has a low bulk density.

On the other hand, a catalyst system prepared from a solid component resulting from the supporting of a titanium tetrahalide on a carrier obtained by pre-treating a magnesium dihalide with both an organic acid ester and a silicon compound, and an organoaluminum compound (to be referred to as "catalyst system B") exhibits a high stereospecificity when it is used to produce polymers having a low melt flow index. However, when polymers having a practical melt flow index are produced with this catalyst system B with control of molecular weight, they have greatly reduced stereoregularity. Unless an amorphous polymer is removed, the obtained polymers do not have feasible mechanical properties. The catalyst system B is therefore not yet satisfactory for basically simplifying the manufacturing process and reducing the cost of production.

The widely available conventional PP has a stiffness of higher than 11,000 Kg/cm$^2$ at a melt flow index ("MFI" or "M.F.I." for short) of 3 g/10 min. The above stiffness value corresponds to the H.R. of about 94%, which is critical value of practical use.

The PP having lower H.R. than 94% cannot exhibit good mechanical properties and must be treated with a suitable solvent to remove its amorphous portion for practical use.

DETAILED DESCRIPTION OF THE INVENTION

Figure 2:
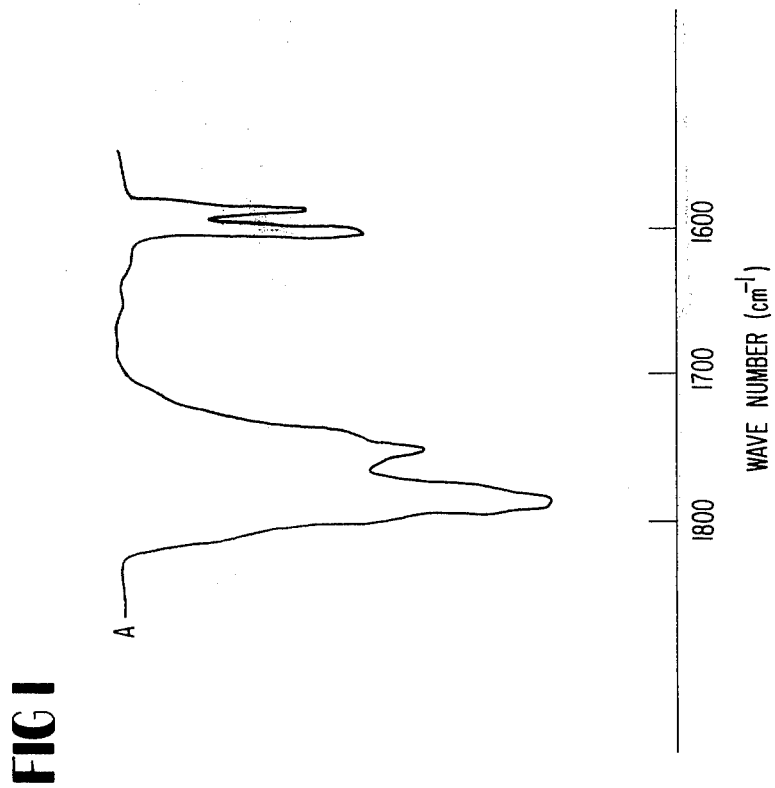
FIG. 2 is a diagram showing the infrared absorption spectra of carriers obtained in Examples 89, 90, 88 and 91, which are expressed by B, C, D and E, respectively.

In view of the foregoing, the present inventors made various investigations in order to obtain a catalyst system which can give stereoregular polymers and has so high a polymerization activity as to make it unnecessary to remove the resulting catalyst residue and amorphous polymer. These investigations led to the discovery of a catalyst system consisting essentially of (A) a solid component obtained by contacting (1) a magnesium dihalide compound pulverized together with an acyl halide with (2) a mixture or addition-reaction product of a tetravalent titanium compound containing at least one halogen atom (to be referred to as a titanium compound) with at least one electron donor compound selected from the group consisting of organic compounds containing a P—O bond (to be referred to as phosphorus-containing organic compounds), organic compounds containing an Si—O bond (to be referred to as silicon-containing compounds), ether compounds, nitrite ester compounds, sulfite ester compounds, alcohol compounds and phenol compounds, (B) an organic aluminum compound, and (C) an organic carboxylic acid ester compound. It was found that this catalyst system has a very high polymerization activity, and stereoregularity and surprisingly, unlike conventional catalysts for olefin polymerization, does not cause the decrease of H. R. at all when producing polymers having a high melt flow index by controlling the molecular weight of polymers using hydrogen, etc. during polymerization; and therefore, the catalyst can afford polymers having very high stereoregularity in the MFI region within which the polymers have feasible moldability (an MFI value of 1 to 20 g/10 minutes). These discoveries led to the present invention.

The catalyst system obtained in accordance with this invention is especially effective for the homopolymerization of propylene and the copolymerization of propylene with a minor amount of other α-olefin (including ethylene). As shown in FIGS. 4 to 8, the H.R. of the resulting polymer abruptly decreases with an increase of MFI in the case of the homopolymerization of propylene by any of the conventional catalyst system, such as a catalyst system composed mainly of titanium trichloride [(E) in FIGS. 4, 5, 7 and 8 and (F) in FIG. 6], a catalyst system A [(D) in each figure], and a catalyst system B [(E) in each figure]. This is generally considered to be ascribed to the following reason. A polymerization product contains polymers of various molecular weights and various stereoregularities. Boiling n-heptane substantially permit the selective extraction of polymers of low stereoregularity, but does not extract a polymer having low stereoregularity and high molecular weight. Hence, from a polymer having a low MFI (a high molecular weight), a portion having low stereoregularity cannot be completely extracted. When the MFI increases (the molecular weight decreases), the content of a high-molecular-weight portion decreases, and extraction is performed relatively completely. Hence, with increasing MFI, the n-heptane extraction residue decreases, and therefore, the stereoregularity of the polymer appears to be reduced. Thus, this has been considered to be a natural phenomenon in the production of polyolefins. It is surprising that no change occurs in H.R. even when MFI is varied in the case of the polymers obtained by the process of the present invention. It is presumed, however, that the catalyst system used in this invention is the type of the catalyst which does not produce a high molecular-weight, low stereoregular polymer at all, and the distribution of active sites of the catalyst is greatly different from that of the conventional catalyst.

Since the catalyst system of this invention has the characteristic features described above, the following advantages can be mentioned.

When an olefin is polymerized by a catalyst system composed mainly of titanium trichloride, a catalyst system A, or a catalyst system B, the polymer has reduced stereoregularity in a feasible MFI region but has high stereoregularity in a low MFI region. On the other hand, the catalyst system of the present invention can afford polymers having far higher stereoregularity in a processable MFI region and they have better moldability and superior mechanical characteristics.

Since that the portion of the polymer which is soluble in the polymerization medium is far smaller in amount in the production of polymers of a higher MFI region, the troubles occurring in the polymerization process using the conventional catalyst systems, for example, the adhesion of the polymer to the polymerization apparatus such as a reactor and a flash hopper, and the mutual adhesion and agglormeration of the polymer particles in the apparatus, can be overcome entirely. Thus, without removing any low crystalline portion, powdered polymer having good flowability can be obtained by evaporating and drying the polymer solution or polymer slurry directly.

Even if it is desired to remove any part of low crystalline polymer, only a small portion of polymer is removed by the solvent. Thus, the starting olefin can be utilized effectively.

The catalyst system used in the present invention has a very high polymerization activity, and moreover, has a high productivity per unit amount of the halogenated titanium compound which is closely connected with the coloration, odor, corrosiveness, etc. of the resulting polymer. For this reason, polymers that are useful for practical processings can be easily produced without any post-treatment for removing or inactivating the catalyst residue.

From an overall consideration of the aforesaid advantages, it is seen that the polymerization process in accordance with this invention is well adapted for a low-cost system for polyolefin production which can afford polymers having superior mechanical characteristics and moldability without a post-treatment for removing the resulting low-crystalline portion and catalyst residue from the polymer.

Typical examples of the acyl halide compounds which can be used in the present invention are represented by general formula (I)

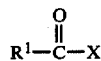

$$R^1 - \overset{\overset{O}{\|}}{C} - X \quad \text{(I)}$$

In formula (I), $R^1$ represents a hydrocarbon radical having at most 20 carbon atoms selected from the group consisting of alkyl radicals, alkenyl radicals, cycloalkyl radicals, cycloalkenyl radicals, aryl radicals, and aralkyl radicals, and derivatives of these hydrocarbon radicals substituted with at most 3 halogen atoms or alkoxy radicals having at most 20 carbons and X is halogen atom.

Typical examples of the acyl halide compounds are aliphatic carbonyl halide compounds such as acetyl fluoride, acetyl chloride, acetyl bromide, acetyl iodide, propionyl chloride, propionyl bromide, butyryl chloride, butyryl bromide, palmitoyl chloride, stearoyl chloride, stearoyl bromide, oleoyl chloride, oleoyl bromide, trichloroacetyl chloride, trichloroacetyl bromide, oxalyl dichloride, malonyl dichloride, succinyl dichloride, glutaryl dichloride, adipoyl dichloride, acryloyl chloride, acryloyl bromide, fumaroyl dichloride, methacryloyl chloride, cinnamoyl chloride, cinnamoyl bromide, $\beta$-carbomethoxy propionyl chloride, $\beta$-carbomethoxyacryloyl chloride, and phenoxyacetyl chloride; alicyclic carbonyl halide compounds such as cyclohexane carbonyl chloride, cyclohexane carbonyl bromide, norbornene dicarbonyl dichloride and furoyl chloride and aromatic carbonyl halide compounds such as benzoyl fluoride, benzoyl chloride, benzoyl bromide, benzoyl iodide, naphthoyl chloride, naphthoyl bromide, toluoyl chloride, toluoyl bromide, phthaloyl dichloride, anisoyl chloride and chlorobenzoyl chloride. Among these acyl halide compounds, the aromatic carbonyl halides compounds are preferred, and particularly, benzoyl chloride, benzoyl bromide, and toluoyl chloride are suitable.

The magnesium dihalide compounds is free from combined water; namely, it is an anhydrous magnesium dihalide. Desirably, commercially available magnesium dihalide compounds are dried by heating at 200° to 600° C. before use. Typical example of the magnesium dihalide compound are magnesium dichloride, magnesium dibromide and magnesium diiodide, the magnesium dichloride being especially suitable.

The treatment of the magnesium dihalide with the acyl halide can be performed by copulverization to contact them each other intimately. It is not effective to mix them slightly. The copulverization should be performed by using a pulverizer such as a ball mill, vibratory ball mill, impact pulverizer, or colloid mill. The mixture may be cooled for convenience of operation when a large amount of heat is generated by this treatment. Usually, the copulverization is carried out at room temperature. The time required for copulverization differs according to the performance, etc. of the pulverizer, and cannot be definitely specified. For example, it is necessary to copulverize them for at least 30 minutes, preferably for at least 1 hour, when about 20 g of the materials to be pulverized are placed in a 1-liter vessel with an inside diameter of 10 cm having porcelain balls with a diameter of 1 cm accomodated therein to an apparent volume of 50%, and then copulverized with a vibratory ball mill an amplitude of 6 mm and with a vibration frequency of 30 Hz (herz).

In the present invention, the proportion of the acyl halide compound to be copulverized per mole of the magnesium dihalide compound is normally 0.01 to 2 moles, preferably 0.04 to 1 mole. If it is less than 0.01 mole per mole of the magnesium dihalide compound, the catalyst system obtained not only is low in polymerization activity, but also scarcely increases the stereospecificity of the polymer obtained. On the other hand, if it is more than 2 moles, the polymerization activity is very much reduced.

The carrier obtained by the aforesaid copulverization treatment is a gray brown powder, and deliquesces by moisture in the air. Moreover, the acyl halide decomposes to give off a strong irritating odor.

Figure 1:
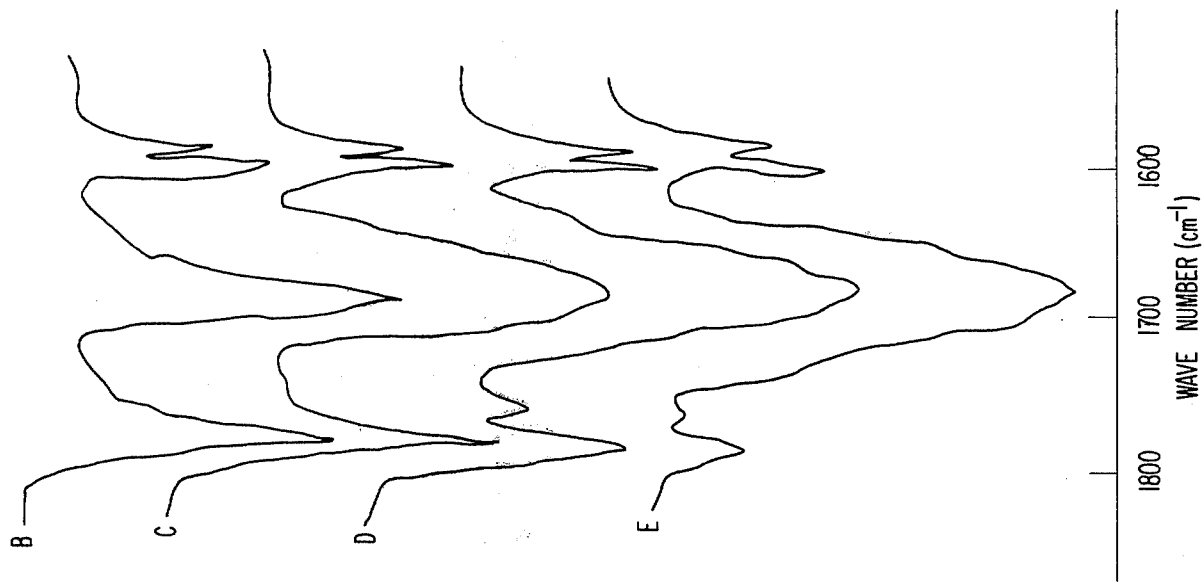
FIG. 1 is a diagram showing the infrared absorption spectrum of benzoyl chloride used as a starting material, which is expressed by A.

The infrared absorption spectra of this carrier are measured by the nujol method with an infrared spectrophotometer. The infrared spectra of the original acyl halide (benzoyl chloride) show an absorption band at 1783 cm$^{-1}$ attributed to the stretching vibration of its carbonyl group. (see A of FIG. 1) Those of the carrier obtained by copulverizing the magnesium dihalide (e.g., MgCl$_2$) with the acyl halide show a new remarkable absorption band at 1685 cm$^{-1}$ attributed to the carbonyl group which is considered to coordinate to the magnesium dihalide.

Figure 3:
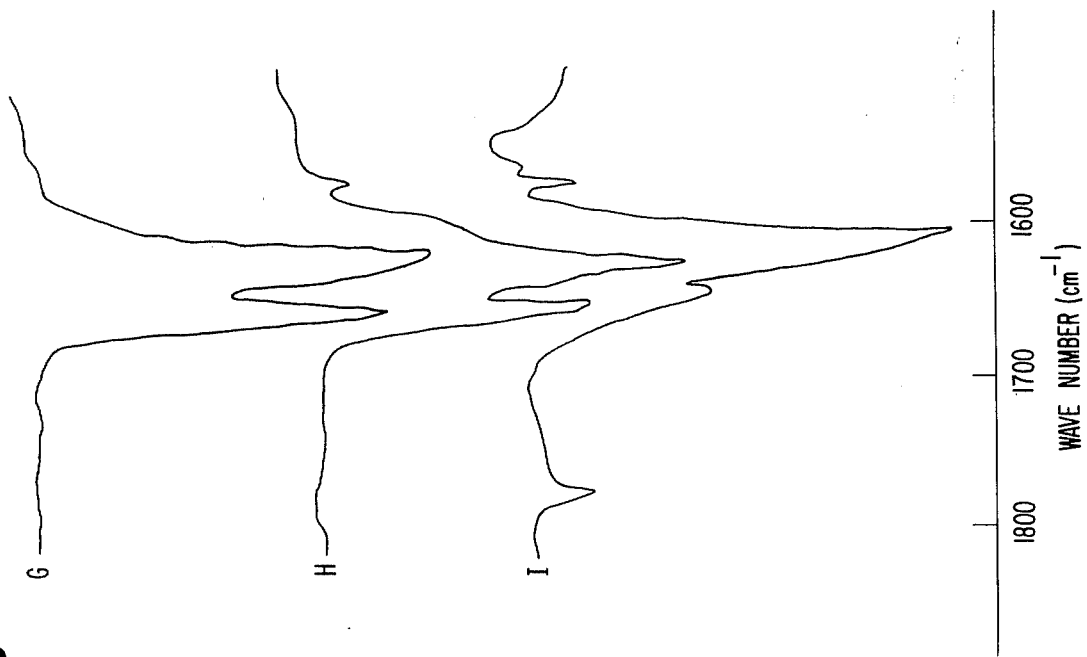
FIG. 3 is a diagram showing the infrared absorption spectra of carriers obtained in Comparative Examples 57, 58 and 59, which are expressed by G, H and I, respectively.

The ratio of the absorbance at 1685 cm$^{-1}$ to that at 1783 cm$^{-1}$ due to the unreacted acyl halide increases with the duration of the copulverizing, and the latter absorption becomes to be scarcely observed after sufficient copulverization. (see B, C, D and E of FIG. 2) The effectiveness as a catalyst (polymerization activity and crystallinity of the polymer) is closely related to that ratio. The infrared spectrum of the carrier obtained by reacting the magnesium dihalide with the acyl halide in a solvent shows no absorption band at the region of 1660 to 1730 cm$^{-1}$ (see G, H and I of FIG. 3), and the resulting catalyst has an unsatisfactory performance.

Typical examples of the titanium compounds which can be used in the present invention are represented by general formula (II)

$$TiX^2{}_n(OR^2)_m(NR^3R^4)_l(OCOR^5)_p \quad (II)$$

In formula (II), $X^2$ is a chlorine, bromine or iodine atom, $R^2$, $R^3$ and $R^4$ are the same or different and represent a hydrocarbon radical having at most 12 carbon atoms selected from the group consisting of alkyl radicals, alkenyl radicals, cycloalkyl radicals, aryl radicals and aralkyl radicals, n is a number of 1 to 4, each of m, l and p is 0 to 3 and n+m+l+p is 4.

Typical examples of the titanium compound are titanium tetrachloride, titanium tetrabromide, titanium tetraiodide, methoxytitanium trichloride, dimethoxytitanium dichloride, trimethoxytitanium chloride, ethoxytitanium trichloride, diethoxytitanium dichloride, triethoxytitanium chloride, propoxytitanium trichloride, butoxytitanium trichloride, dimethylaminotitanium trichloride, bis(dimethyl amino)titanium dichloride, diethylaminotitanium trichloride, titanium propionate trichloride and titanium benzoate trichloride. Among the above-mentioned titanium compounds, titanium tetrahalides and alkoxytitanium halides are particularly suitable. For practical applications titanium tetrachloride, methoxytitanium trichloride and ethoxytitanium trichloride are most suitable.

The electron donor compound used in the present invention is selected from the group consisting of the phosphorus-containing organic compounds, the silicon-containing organic compounds, the ether compounds, the nitrite ester compounds, the sulfite ester compounds, the alcohol compounds and the phenol compounds.

Typical examples of the phosphorus-containing organic compounds which can be used in the present invention are represented by general formulae (III) and (IV).

$$X^3{}_lY_mP(OR^6)_n \quad (III)$$

$$X^4{}_qY_rP(O)(OR^7)_s \quad (IV)$$

In formulae (III) and (IV), the sum of l, m and n or q, r and s is 3, $0 \leq l$, $m < 3$, $0 < n \leq 3$, $R^6$ and $R^7$ are the same or different and represent a hydrocarbon radical having at most 20 carbon atoms selected from the group consisting of alkyl radicals, alkenyl radicals, cycloalkyl radicals, cycloalkenyl radicals, aryl radicals and aralkyl radicals and derivatives of hydrocarbon radicals substituted with at most 3 halogen atoms or alkoxy radicals or aryloxy radicals having at most 20 carbon atoms, $X^3$, $X^4$ and Y are the same or different and represent a hydrogen atom, a halogen atom and said hydrocarbon radical or its substituted derivative.

Typical examples of the phosphorus-containing organic compounds of formula (III) are ethyl diethylphosphinite, ethyl butylethylphosphinite, ethyl phenylmethylphosphinite, ethyl phenylvinylphosphinite, phenyl dibenzylphosphinite, dimethyl methylphosphonite, diphenyl methylphosphonite, diethyl benzylphosphonite, diphenyl ethylphosphonite, dibutyl benzylphosphonite, diethyl 2-chloroethylphosphonite, trimethyl phosphite, triethyl phosphite, tri-n-propyl phosphite, tri-isopropyl phosphite, triallyl phosphite, tri-n-butyl phosphite, triphenyl phosphite, tricyclohexyl phosphite, tribenzyl phosphite, tris(3-ethoxy propyl) phosphite, tris(2-chloroethyl) phosphite, tricresyl phosphite, diphenylnonyl phosphite, tris(nonylphenyl) phosphite, diphenylisodcecyl phosphite, triisodecyl phosphite, tris(2-ethyl hexyl) phosphite, ethyl ethylphosphonochloridite, phenyl ethyl phosphonochloridite, phenyl phenylphosphonochloride, n-butyl phenyl phosphonochloridite, ethyl ethylphosphonochloride diethyl chlorophsphite, diphenyl chlorophosphite, dioctylchlorophosphite, diethyl bromophosphite, dibenzyl chlorophosphite, benzyl dichlorophosphite, 2-chloroethyl dichlorophosphite and hexyl dichlorophosphite.

Typical examples of the phosphorus-containing organic compound of formula (IV) are methyl dimethylphosphinate, ethyl diethylphosphinate, ethyl dipropylphosphinate ethyl di-n-butylphosphinate, ethyl diphenylphosphinate, methyl dicyclohexylphosphinate, 2-chloroethyl dibenzylphosphinate, ethyl ethylphosphonochloridate, phenyl ethylphosphonochloridate, n-butyl phenylphosphonochloridate, ethyl ethylphosphonobromidate, diethyl methylphosphonate, diphenyl phenylphosphonate, dioctyl butylphosphonate, diethyl phenylphosphonate, diallyl phenylphosphonate, bis(2-chloroethyl) phenyl phosphonate, diethyl cyclohexylphosphonate, diethyl benzylphosphonate, diethyl phosphorochloridate, di-n-butyl phosphorochloridate, dioctyl phosphorochloridate, diphenyl phosphorochloridate, dibenzyl phosphorochloridate, dicresyl phosphorochloridate, bis(2-chloroethyl) phosphorochloridate, diphenyl phosphorobromidate, ethyl phosphorodichloridate, n-butyl phosphorodichloridate, phenyl phosphorochloridate, benzyl phosphrodichloridate, cresyl phosphorodichloridate, ethylphosphorodibromidate, triethyl phosphate, tri-n-butyl phosphate, triphenyl phosphate, tribenzyl phosphate, trihexyl phosphate, diethylphosphate, di-n-butyl phosphate, diphenyl phosphate, cresyl diphenyl phosphate, tricresyl phosphate, tritolyl phosphate, trixylyl phosphate, diphenyl-mono-o-phosphate, diphenyl phosphate, tris(-bromo chloropropyl) phosphate, triethylphosphine oxide, tri-n-butyl phosphine oxide and triphenylphosphine oxide.

Typical examples of the silicon-containing organic compounds which can be used in the present invention are represented by general formulae (V), (VI) and (VII).

$$Si(OR^8)_m R^9_n \quad (V)$$

$$R^{10}(R_2^{11}SiO)_l SiR_3^{12} \quad (VI)$$

$$(R_2^{13}SiO)_p \quad (VII)$$

In formulae (V), (VI) and (VII), $R^8$, $R^9$ and $R^{13}$ are the same or different and represent a hydrocarbon radical having at most 20 carbon atoms selected from the group consisting of alkyl radicals, alkenyl radicals, cycloalkyl radicals, cycloalkenyl radicals, aryl radicals and aralkyl radicals and derivatives of these hydrocarbon radicals substituted with at most 3 halogen atoms or alkoxy radicals having at most 20 carbon atoms, $R^9$ represents a hydrogen atom or a halogen atom too. $R^{10}$, $R^{11}$ and $R^{12}$ are the same or different, and represent the above-mentioned hydrocarbon, its substituted derivative, or a halogen atom, $m+n$ is 4 (with the proviso that m is not 0), l is an integer of from 1 to 1000, and p is an integer of from 2 to 1000.

Typical examples of the silicon-containing organic compounds of formula (V) are tetramethoxysilane, diethoxydimethylsilane, tetraethoxysilane, triethoxyethylsilane, diethoxydiethylsilane, ethoxytriethylsilane, tetrapropoxysilane, dipropoxydipropylsilane, tetra-isopropoxysilane, diisopropoxydiisopropylsilane, dimethoxydiethylsilane, diethoxydibutylsilane, tetra-n-butoxysilane, di-n-butoxy-di-n-butylsilane, tetra-sec-butoxysilane, tetrahexoxysilane, tetraoctoxysilane, trimethoxychlorosilane, dimethoxy-dichlorosilane, dimethoxydibromosilane, triethoxychlorosilane, diethoxydibromosilane, dibutoxydichlorosilane, dicyclopentoxydiethylsilane, diethoxydiphenylsilane, 3,5-dimethylphenoxytrimethylsilane, methylphenyl-bis(2-chloroethoxy)silane, dimethoxydibenzylsilane, tri-n-propylallyloxysilane, allyltris(2-chloroethoxy)silane and trimethoxy-3-ethoxypropylsilane.

Typical examples of the silicon-containing organic compounds of the general formula (VI) are hexamethyldisiloxane, decamethyltrisiloxane, tetracosamethylundecasiloxane, 3-hydroheptamethyltrisiloxane, hexaphenyldisiloxane, hexacyclohexyldisiloxane, 1,3-dimethyldisiloxane, hexaethyl-disiloxane, octaethyltrisiloxane, hexapropyldisiloxane, 1,3-dichlorotetramethyldisiloxane, 1,3-bis(p-phenoxyphenyl)-1,3-dimethyl-1,3-diphenyldisiloxane, 1,3-diallytetramethyl-disiloxane, 1,3-dibenzyltetramethyldisiloxane, 2,2,4,4-tetraphenyl-2,4-disila-1-oxacyclopentane, 1,1,3,3-tetramethyldisiloxane and hexachlorodisoloxane.

Typical examples of the silicon-containing organo compounds of the general formula (VII) are 1,3,5-trimethylcyclotrisiloxane, hexamethylcyclotrisiloxane, pentamethylchlorocyclocyclotrisiloxane, 1,3,5-trimethyltriphenylcyclotrisiloxane, hexaphenyltriphenylcyclotrisiloxane, 1,3,5-tribenzyltrimethylcyclotrislioxane and 1,3,5-triallyltrimethylcyclotrisiloxane.

Among these silicon-containing organic compounds, the alkoxysilane compounds and alkylpolysiloxane compounds represented by the general formulae (VI) and (VII) as set forth above (but in which l and p each is an integer of 800 or less) such as methylpolysiloxane and ethylpolysiloxane are preferred, the tetramethoxysilane, tetraethoxysilane, dimethylmethoxysilane, diethyldiethoxysilane, diethyldiethoxysilane, methoxytrimethylsilane, trimethoxymethylsilane, hexamethyldisiloxaneoctamethyltrisiloxane and dimethylpolysiloxane being particularly suitable.

Typical examples of the ether compound which can be used as the electron donor compound, in the present invention are linear or cyclic ether compounds which have at most 40 carbon atoms, and hydrocarbon radicals selected from the group consisting of aliphatic hydrocarbon radicals, cycloaliphatic hydrocarbon radicals and aromatic hydrocarbon radicals and derivatives of these hydrocarbon substituted with at most 3 halogen atoms.

Typical examples of the ether compound are linear aliphatic ether compounds such as dimethyl ether, methyl ethyl ether, diethyl ether, di-n-propyl ether, diisopropyl ether, di-n-butyl ether, diisobutyl ether, diisoamyl ether, dioctyl ether, didodecyl ether, diallyl ether, isobutyl vinyl ether, polyethylene glycol, polypropylene glycol, ethylene glycol dimethyl ether, diethyl cellosolve and benzyl methyl ether linear aromatic ether compounds such as diphenyl ether, di-p-tolyl ether, anisole ethoxy benzene, dimethoxy benzene, anisol bromide and anisole chloride and cyclic ether compounds such as furan, tetrahydrofuran, dioxane, cumarane and tetrahydropyran. Ether compounds having a functional group are preferred. Particularly, diethyl ether, di-n-propyl ether, diisopropyl ether, di-n-butyl ether, diisobutyl ether, anisole ethoxy benzene and diphenyl ether are suitable.

Typical examples of the nitrite ester compounds and the sulfite ester compounds which can be used in the present invention are nitrite ester compounds and sulfite ester compounds which have hydrocarbon radicals having at most 8 carbon atoms selected from the group consisting of alkyl radicals, cycloalkyl radicals, aryl radicals and aralkyl radicals. Particularly, nitrite ester compounds and sulfite ester compounds which have alkyl radicals having at most 8 carbon atoms are suitable. Examples of suitable nitrite compounds and sulfite compounds are methyl nitrite, ethyl nitrite, butyl nitrite, isoamyl nitrite, dimethyl sulfite and diethyl sulfite.

The alcohol compounds and the phenol compounds which can be used in the present invention are monohydroxy or polyhydroxy alcohol compounds, phenol compounds and naphthol compounds. Especially preferred alcohol compounds are monohydroxy or polyhydroxy compounds which have 2 to 20 carbon atoms and hydrocarbon radicals selected from the group consisting of alkyl radicals, cycloalkyl radicals and aralkyl radicals and derivatives of these hydrocarbon radicals substituted with at most 3 halogen atoms and/or alkoxy radicals. Typical examples of the preferred alcohol compound are ethyl alcohol, n-propyl alcohol, isopropyl alcohol, n-butyl alcohol, isobutyl alcohol, sec-butyl alcohol, tert-butyl alcohol, isoamyl alcohol, cyclohexanol, stearyl alcohol, benzyl alcohol, ethylene glycol and propylene glycol, glycerine.

Phenol compounds and naphthol compounds which have at most 20 carbon atoms and their derivatives substituted with at most 3 alkyl radicals, alkoxy radicals and/or halogen atoms are preferred. Typical examples of the preferred phenol compounds and naphthol compounds are phenol m-cresol, p-cresol, p-methoxy phenol, p-tert-butyl phenol, and 2,6-dimethyl phenol, β-naphthol.

Among the alcohol compounds, the phenol compounds and the naphthol compounds, aliphatic and cycloaliphatic alcohol compounds having 2 to 20 carbon atoms and phenol and phenol compounds which are substituted with alkyl radicals which having at most 10 carbon atoms are especially suitable.

Preferably, the titanium compound and the electron doner compound are contacted simultaneously with the magnesium dihalide compound pulverized together with the acyl halide [to be referred to as component (1)]. The effect of the present invention cannot be fully achieved if the component (1) contacted with the titanium component beforehand is washed to remove the excess titanium compound with a solvent and then is contacted with the electron doner compound, or if the component (1) contacted with the electron doner compound is washed to remove the excess electron doner compound and then is contacted with the titanium compound. It is therefore preferred to add component (1) to a mixture of the titanium compound and the electron donor compound or a reaction product formed between them by heating, etc., or to mix the titanium compound, the electron donor compound and component (1) simultaneously.

The proportion of the titanium compound is generally 0.1 to 50 moles, preferably 0.2 to 20 moles, per mole of the electron donor compound. The especially preferred proportion of the titanium compound is 0.5 to 10 moles because in these proportions a great amount of a quantitative complex compound of the electron donor compound and the titanium compound is formed.

The contacting treatment may be carried out by simple mixing of the component (1), the titanium compound and the electron donor compound. In order to produce the solid catalyst component more efficiently, it is preferred to stir the ingredients in a suitable solvent, or to copulverize them with a pulverizer as described hereinabove.

As solvents for mixing or reacting the titanium compound with the electron donor compound or for contacting them with the component (1), aliphatic hydrocarbons such as pentane, hexane, heptane and octane, aromatic hydrocarbons such as benzene, toluene and xylene, and halogenated hydrocarbons such as methylene chloride, trichloroethane, trichloroethylene and chlorobenzene can be used preferablily. The aromatic hydrocarbons are especially preferred. The concentration of the ingredients in the solvent is prefered to be as high as possible unless the operation is prevented, and is usually at least 0.005 mole of Ti/liter.

The contacting temperature is generally from −10° C. to +200° C. At lower temperatures, the polymerization activity of the resulting catalyst is low. If the temperature is higher, the catalyst affords polymers having low stereo-regularity. In order to obtain catalysts having the best performance, the temperature is desirably 20° to 120° C.

The contacting time is usually required at least 10 minutes, to support the titanium compound on the carrier, and the sufficient result is obtained by at most 2 hours contact, but the contact for further duration doesn't bring a remarkable improvement.

After the contacting treatment, the product is preferably washed with an inert solvent (for example, the aliphatic and aromatic hydrocarbons used as a solvent for the contacting treatment).

Typical examples of the organic aluminum compounds which can be used in the present invention are represented by the general formulae (VIII), (IX) and (X).

In general formulae, $R^{14}$, $R^{15}$ and $R^{16}$ and $R^{18}$, $R^{19}$, $R^{20}$ and $R^{21}$ are the same or different, $R^{14}$, $R^{15}$ and $R^{16}$ represent a hydrogen atom, a halogen atom or an alkyl radical or alkoxy radical having at most 8 carbon atoms, $R^{17}$ represents an alkyl radical having at most 8 carbon atoms, $R^{18}$, $R^{19}$ and $R^{20}$ represent an alkyl radical having at most 8 carbon atoms, $R^{21}$ represents a halogen atom or an alkyl radical having at most 8 carbon atoms and $X^5$ represents a halogen atom, with the proviso that at least one of $R^{14}$, $R^{15}$ and $R^{16}$ is an alkyl radical. In formula (IX), the sum of m and n is 3.

Typical examples of these organic aluminum compounds are trialkylaluminum compounds such as triethylaluminum, triisobutylaluminum and trihexylaluminum, alkylaluminum halide compounds such as diethylaluminum chloride, ethylaluminum sesquichloride and dibutylaluminum chloride, dialkylaluminum hydride compounds such as diethylaluminum hydride, alkylaluminum alkoxide compounds such as diethylaluminum ethoxide and dibutylaluminum methoxide and alkylaluminum amide compounds such as diethylaluminum diethylamide. Among these organo aluminum compounds, the trialkylaluminum compounds are preferable. Particularly, trialkylaluminum compounds which have alkyl radicals having at most 6 carbon atoms (e.g., triethylaluminum, triisobutylaluminum) are suitable. In the polymerization of propylene alone or propylene with other olefin, trialkyl aluminum compounds are preferable.

Typical examples of the carboxylic acid ester compounds which can be used in the present invention are ester compounds which are derived from aliphatic, cycloaliphatic or aromatic carboxylic acids having at most 20 carbon atoms and aliphatic cycloaliphatic or aromatic alcohols having at most 20 carbon atoms. The above-mentioned carboxylic acid ester compounds may be substituted with at most 3 halogen atoms or alkoxy groups.

Typical examples of the carboxylic acid ester compounds are aliphatic carboxylic acid ester compounds such as methyl formate, methyl acetate, ethyl acetate, amyl acetate, cyclohexyl acetate, vinyl acetate, butyl acetate, ethyl butyrate, phenyl propionate, furfuryl propionate, diethyl malonate, diethyl succinate, diethyl furmarate, methyl acrylate, methyl methacrylate and ethyleneglycol diacetate, cycloaliphatic carboxylic acid ester compounds such as methyl cyclohexane carboxylate and ethyl norbornenecarboxylate and aromatic carboxylic acid ester compounds such as methyl benzoate, ethyl benzoate, n-propyl benzoate, isopropyl benzoate, butyl benzoate, octyl benzoate, cyclohexyl benzoate, phenyl benzoate, methyl toluate, ethyl toluate, methyl anisate, dimethyl phthalate, diethyl phthalate, diethyl terephthalate, ethyleneglycol dibenzoate and methyl naphthoate. Among these carboxylic acid ester compounds the aromatic carboxylic acid ester compounds are especially preferred.

In preparing the catalyst system used in this invention, each of the acyl halide, the magnesium dihalogen compound, the titanium compound, the electron donor compound, the organic aluminum compound, and the carboxylic acid ester compound may be used singly or as a mixture of at least two species.

The solid component obtained by contacting the component (1) with a mixture or an addition-reaction product of the electron doner compound and the titanium compound, the trialkyl-aluminum compound and the organic carboxylic acid ester compound may be separately introduced into a polymerization vessel. Alternatively, two or all of these ingredients may be mixed prior to the introducing into the vessel. It is desirable that all the ingredients are mixed immediately before the performance of polymerization.

The amount of the aforesaid mixture or addition-reaction product (as titanium atom) or the organic carboxylic acid ester (if used) is generally 0.001 to 1 mole or 0.02 to 1 mole respectively, preferably 0.001 to 0.2 mole or 0.1 to 0.7 mole respectively, per mole of the organic aluminum compound in the polymerization system.

An olefin polymer can be obtained by contacting an olefin containing at most 12 carbon atoms with a catalyst system obtained from the solid component, the organoaluminum compound and the organic carboxylic acid ester compound. Typical examples of the olefin are ethylene, propylene, butene-1, 4-methylpentene-1, hexene-1 and octene-1. These olefins may be homopolymerized or copolymerized (for example, the copolymerization of ethylene and propylene).

The above-described catalyst system can be applied to the copolymerization of an α-olefin and to the compolymerization of a diolefin having 4 to 18 carbon atoms with the above-described olefin. Suitable examples of diolefins which can be used are a non-conjugated aliphatic diolefin such as 1,4-hexadiene; a non-conjugated monocyclic diolefin such as 4-bicyclohexene; an alicyclic diolefin having cross-linking in the ring such as dicyclopentadiene, methylene norbornene and ethylene norbornene; and a conjugated aliphatic diolefin such as butadiene and isoprene.

The above-described catalyst system can further be applied to the production of the so-called block copolymers formed from an α-olefin and a diolefin. These block copolymers are one in which parts having different length chain from each other are continued and each part consists a homopolymer of an α-olefin, or a statistical copolymer containing therein an α-olefin and at least one comonomer selected from the group consisting of an α-olefin and a diolefin. These α-olefins and diolefins are selected from those described above.

When an olefin containing at least 3 carbon atoms is homopolymerized or copolymerized with ethylene, the olefin alone or both the olefin and ethylene may be reacted in an inert organic solvent or in a liquid olefin. Suitable examples of inert organic solvents which can be used include aliphatic or alicyclic hydrocarbons such as butane, pentane, hexane, keptane, cyclohexane, methylcyclohexane and a mixture thereof.

The polymerization temperature is generally from −10° C. to 200° C., and for practical purposes, it is from room temperature to 170° C.

The polymerization pressure is, in general, atmospheric pressure to 100 atms., preferably 10 to 60 atms. The polymerization pressure is, of course, a function of the polymerization temperature employed.

The polymerization can be performed continuously or intermittently. The production of the so-called block copolymers can be performed in various manners. It is preferred to employ a two-step method in which the homopolymerization of an α-olefin, generally propylene is initially carried out in the method as described above, and then, the polymerization of other α-olefin and/or a diolefin, generally ethylene is carried out in the presence of the still active homopolymer chain. In this two-step method, the polymerization of the second step can be carried out after completely or partially removing the unreacted monomer in the first step.

The organic metal compounds and the solid catalyst component used in the present invention can be individually added to the polymerization medium, or can be brought into contact with each other for a period of up to 2 hours at −40° to 80° C. before charging into the polymerization reactor.

The total amount of the organic metal compound used is not particularly limited, but is generally more than 0.1 mmol, preferably 0.5 mmol, per 1 liter of the diluent or of the liquid monomer or of the capacity of reactor.

The molecular weight of the polymer can be controlled by addition of hydrogen, diethylzinc, an alkyl halide and the like.

The polymerization reactor for the production of polyolefin by the catalyst of this invention can be any of tower-type, vessel-type and tube-type reactors, and 2 or more of these reactors can be employed in series or in parallel.

The thus obtained catalyst residue-containing polymer powder is purified or inactivated by the known method (such as, for example, washing with a liquid monomer, hydrocarbon, alcohol or $H_2O$) and then brought into a commercial use. The thus obtained polymer can also be brought into a commercial use without any purification or with simple inactivation with steam and/or alcohol vapor.

The subsequent aftertreatment or polymerization control which is employed in this invention is not limited but can be performed in the known methods, respectively.

The following examples illustrate the present invention in more detail.

The heptane index (H. R.) is the percentage of the residue resulting after extracting a polymer with boiling n-heptane for 6 hours.

The melt flow index (MFI) is measured by the method of JIS K-6758-1968.

The stiffness and tensile yield strength are measured in accordance with ASTM D-747-68 and ASTM D-638-64T.

The compounds used in the preparation of the catalyst components and in polymerizations in the following Examples and Comparative Examples (e.g., organic solvents, olefins, hydrogen, titanium compounds, magnesium dihalogen compounds, alcohol compounds, phenol compounds, and organic carboxylic acid ester compounds) were substantially free of water. The preparation of the catalyst components and the polymerization were carried out in a substantially water-free atmosphere of nitrogen.

EXAMPLE 1

(A) Preparation of catalytic component (A)

Commercially available anhydrous magnesium chloride was dried by heating at about 500° C. for 15 hours under a stream of nitrogen. The resulting magnesium chloride (20.0 g) and 6.0 g of benzoyl chloride were placed in a 1-liter vibratory ball mill pot (packed with 500 ml of porcelain balls with a diameter of about 10 mm), and copulverized for 8 hours with an amplitude of 8 mm and a vibrating cycle of 30 Hz to obtain a pale brown gray powdery carrier.

Fifteen grams of the resulting uniform copulverized product were placed in a 500 ml flask, and a solution obtained by mixing 125 ml of toluene, 86.3 g of titanium tetrachloride and 49.5 g of triphenyl phosphate at room temperature was added. The mixed ingredients were stirred at 65° C. for 2 hours. The resulting solid component was separated by filtration, and washed with toluene until the titanium tetrachloride was no longer detected in the filtrate. After washing, the filtrate was dried at 40° C. under reduced pressure to afford a powdery catalyst component (A). A chemical analysis of the catalyst component (A) showed that it contained 1.41% by weight of titanium atom.

(B) Polymerization of propylene and the mechanical properties of the polymer obtained Into a 3.0 l stainless steel autoclave whose inside atmosphere had been replaced by dry nitrogen gas (substantially free from water) were placed 48.0 mg of the catalytic component (A) prepared as described above, 0.54 g of triethylaluminum and 0.22 g of ethyl benzoate. Then 760 g of propylene and 0.07 g of hydrogen were added. The polymerization system was heated to 70° C. Polymerization was continued for 60 minutes at this temperature. The gas present inside the autoclave was released and the polymerization was terminated. 296 g of polypropylene powder was obtained. The polymerization activity was 6,167 g/g-catalytic component (A)·hr. and 437 kg/g-Ti·hr. H.R. of the polypropylene obtained was 96.4%.

100 parts by weight of the polypropylene powder without purification, 0.15 part by weight of tetrakis[methylene-3-(3',5'-di-tert-butyl-4'-hydroxyphenyl)propionate]methane, 0.20 part by weight of distearyl thiodipropionate and 0.10 part by weight of calcium stearate as stabilizers were mixed and kneaded using an extruder (screw diameter 20 mm; L/D 40) at a temperature of 210° C. under an atmosphere of nitrogen gas to prepare pellets of the polypropylene. The pellets obtained showed whiteness and transparency similar to those of conventional polypropylene.

M.F.I. of the pellets obtained was 7.6 g/10 minutes. The stiffness of press-formed plates prepared from the pellet was 12,900 kg/cm$^2$ and their tensile yield strength was 341 kg/cm$^2$. Therefore, the polypropylene obtained showed excellent mechanical properties.

COMPARATIVE EXAMPLE 1

A catalytic component was prepared by the same procedure as in Example 1 (A), except that triphenyl phosphate employed in the preparation of the catalytic component (A) in the Example 1 was not used. The titanium atom content of the catalytic component obtained was 2.4% by weight.

Propylene was polymerized by the same procedure as in Example 1 (B), except that the catalytic component (A) used in Example 1 (B) was replaced by 46.8 mg of the catalytic component obtained above. Consequently, 252 g of a polypropylene powder was obtained. Therefore, the polymerization activity was 5,384 g/g-catalytic component ·hr. and 224 kg/g-Ti·hr. H. R. of the polypropylene obtained was 85.2%. Pellets were prepared under the same conditions as in Example 1 (B). The whiteness and transparency of the pellets obtained were similar to those of conventional polypropylene. M.F.I. of the pellets obtained was 5.8 g/10 minutes. The stiffness of press-formed plates of the pellets was 8,500 kg/cm$^2$ and their tensile yield strength was 232 kg/cm$^2$.

EXAMPLES 2-12, COMPARATIVE EXAMPLE 2

Catalytic components were prepared by the same procedure as in Example 1 (A), except that triphenyl phosphate (hereinafter referred to as "compound (1)") used in the preparation of the catalytic component in Example 1 (A) was replaced by triethylphosphite (hereinafter referred to as a "compound (2)"), triphenylphosphite (hereinafter referred to as a "compound (3)"), diphenylphosphorochloridate (hereinafter referred to as a "compound (4)"), tris(2-chloroethyl)phosphite (hereinafter referred to as a "compound (5)"), tris(2-chloroethyl)phosphate (hereinafter referred to as a "compound (6)"), tris(2-butoxyethyl)phosphate (hereinafter referred to as a "compound (7)"), triethylphosphate (hereinafter referred to as a "compound (8)"), di-n-butylphosphate (hereinafter referred to as a "compound (9)"), diethylphosphite (hereinafter referred to as a "compound (10)") or phosphoryl chloride (hereinafter referred to as a "compound (11)").

Propylene was polymerized by the same procedure as in Example 1 (B), except that the catalytic component (A) used at the polymerization in Example 1 (B) were replaced by the catalytic components which were prepared as described above. Then, pellets and press-formed plates of the polypropylene powders obtained were prepared by the same process as in Example 1 (B). The polymerization activities, the H.R. of the polypropylene powder, the M.F.I. of the pellets, and mechanical properties of press-formed plates are shown in Table 1 below.

Table 1

| Example or Comparative Example No. | Compounds Kind | Amount (g) | Catalytic Components Ti Content[1] | Amount (mg) | Polymerization Activities (A)[2] | (B)[3] | M.F.I. g/10 minutes | H.R. (%) | Stiffness (kg/cm$^2$) | Tensile Yield Strengths (kg/cm$^2$) |
|---|---|---|---|---|---|---|---|---|---|---|
| Example 2 | Compound 2 | 12.6 | 1.52 | 53.6 | 3,797 | 250 | 7.3 | 95.2 | 12,400 | 336 |
| Example 3 | " | 25.2 | 1.45 | 52.9 | 3,782 | 261 | 8.7 | 97.1 | 13,100 | 343 |
| Example 4 | " | 50.4 | 1.46 | 54.2 | 3,021 | 207 | 6.2 | 97.9 | 13,300 | 349 |
| Example 5 | Compound 3 | 47.1 | 1.84 | 32.3 | 9,812 | 533 | 8.2 | 96.7 | 12,800 | 336 |
| Example 6 | Compound 4 | 61.0 | 2.58 | 48.8 | 6,353 | 246 | 7.3 | 98.2 | 13,400 | 350 |
| Example 7 | Compound 5 | 39.0 | 1.59 | 46.7 | 3,051 | 192 | 7.1 | 96.2 | 12,600 | 339 |

Table 1-continued

| Example or Comparative Example No. | Compounds Kind | Amount (g) | Catalytic Components Ti Content[1] | Amount (mg) | Polymerization Activities (A)[2] | (B)[3] | M.F.I. g/10 minutes | H.R. (%) | Stiffness (kg/cm$^2$) | Tensile Yield Strengths (kg/cm$^2$) |
|---|---|---|---|---|---|---|---|---|---|---|
| Example 8 | Compound 6 | 41.5 | 1.63 | 50.5 | 3,449 | 212 | 9.4 | 94.7 | 12,200 | 328 |
| Example 9 | Compound 7 | 30.2 | 2.02 | 50.7 | 3,211 | 159 | 4.6 | 94.2 | 11,800 | 320 |
| Example 10 | Compound 8 | 27.6 | 1.58 | 48.9 | 4,119 | 261 | 8.4 | 94.5 | 12,000 | 326 |
| Example 11 | Compound 9 | 31.9 | 3.74 | 50.2 | 6,306 | 169 | 7.7 | 94.1 | 11,600 | 318 |
| Example 12 | Compound 10 | 20.9 | 2.60 | 50.4 | 3,749 | 144 | 6.0 | 94.2 | 11,700 | 318 |
| Comparative Example No. 2 | Compound 11 | 69.9 | 7.55 | 50.9 | 33 | 5.6 | 7.1 | 88.3 | 9,200 | 263 |

[1] Content of titanium atom (% by weight)
[2] g/g - Catalytic component·hr.
[3] kg/g—Ti·hr.

EXAMPLE 13

(A) Preparation of a catalytic component (B)

A catalytic component was prepared by the same procedure as in Example 1 (A), except that the compound (1) used in the production of the catalytic component in Example 1 (A) was replaced by 12.4 g of dimethyl dimethoxysilane (hereinafter referred to as "compound (12)"). Then the catalytic component are prepared by the same procedure as in Example 1 (A) (hereinafter referred to as "catalytic component (B)"). The titanium content of the catalytic component (B) obtained here was 2.4% by weight.

(B) Polymerization of propylene and mechanical properties of polymer obtained

Propylene was polymerized by the same procedure as in Example 1 (B), except that the catalytic component (A) used in the polymerization of propylene in Example 1 (B) was replaced by 56.4 mg of the purified catalytic component (B). Then the gas present inside the autoclave was released, and the polymerization was terminated to afford 277 g of polypropylene powder. Therefore, the polymerization activity was 4,911 g/g-catalytic component (B)·hr and 208 kg/g-Ti·hr. H.R. of the polypropylene was 96.6%. Pellets were prepared under the same conditions as in Example 1 (B). The whiteness and transparency of the pellets obtained were similar to those of conventional polypropylene.

M.F.I. of the pellets obtained was 7.3 g/10 minutes. The stiffness of the press-formed plates of the pellets was 12,900 kg/cm$^2$ and their tensile yield strength was 342 kg/cm$^2$. Therefore, the polypropylene obtained showed excellent mechanical properties.

EXAMPLES 14–24, COMPARATIVE EXAMPLES 3 AND 4

Catalytic components were prepared by the same process as in Example 13 (A), except that the compound (12) used in the preparation of the catalytic component in Example 13 was replaced by tetraethoxysilane (hereinafter referred to as a "compound (13)"), tetramethoxysilane (hereinafter referred to as a "compound (14)"), hexamethyldisiloxane (hereinafter referred to as a "compound (15)"), dimethylpolysiloxane (350 centistokes at 25° C., hereinafter referred to as a "compound (16)"), 1,3-dichlorotetramethyldisiloxane (hereinafter referred to as a "compound (17)"), 3-hydroheptamethyltrisiloxane (hereinafter referred to as a "compound (18)"), methylhydropolysiloxane (40 centistokes at 25° C., hereinafter referred to as a "compound (19)"), triethoxychlorosilane(hereinafter referred to as a "compound (20)"), hexamethylcyclotrisiloxane (hereinafter referred to as a "compound (21)"), tetrachlorosilane (hereinafter referred to as a "compound (22)"), or dimethyl dichlrosilane (hereinafter referred to as a "compound (23)").

Propylene was polymerized by the same process as in Example 13 (B), except that the catalytic component (B) used on the polymerization in Example 13 (B) was replaced by the catalytic components which were prepared as described above. Then, pellets of the polyrpopylene powder obtained and press-formed plate were prepared by the same procedure as in Example 1 (B). The polymerization activities, the H.R. of the polypropylene, powder, the M.F.I. of the pellets obtained and the mechanical properties of press-formed plates are set forth in Table 2 below.

Table 2

| Example or Comparative Example No. | Compounds Kind | Amount (g) | Catalytic Components Ti Content[1] | Amount (mg) | Polymerization Activities (A)[2] | (B)[3] | M.F.I. g/10 min. | H.R. (%) | Stiffness (kg/cm$^2$) | Tensile Yield Strengths (kg/cm$^2$) |
|---|---|---|---|---|---|---|---|---|---|---|
| Example 14 | Compound 13 | 23.7 | 2.01 | 54.3 | 5,161 | 257 | 6.6 | 96.2 | 13,300 | 334 |
| Example 15 | " | 15.8 | 1.73 | 52.6 | 4,627 | 267 | 7.2 | 95.8 | 12,800 | 326 |
| Example 16 | " | 7.9 | 1.70 | 51.0 | 4,233 | 249 | 5.8 | 94.3 | 12,000 | 313 |
| Example 17 | Compound 14 | 17.3 | 2.12 | 57.2 | 4,822 | 227 | 7.6 | 95.7 | 12,900 | 323 |
| Example 18 | Compound 15 | 36.9 | 2.47 | 54.8 | 5,398 | 218 | 8.5 | 94.4 | 12,200 | 310 |
| Example 19 | Compound 16 | 33.7 | 1.83 | 54.2 | 5,605 | 298 | 6.3 | 95.9 | 13,000 | 333 |
| Example 20 | Compound 17 | 46.2 | 2.16 | 50.9 | 3,828 | 177 | 7.0 | 94.5 | 12,200 | 317 |
| Example 21 | Compound 18 | 50.6 | 1.46 | 53.3 | 3,631 | 248 | 6.6 | 95.1 | 12,200 | 321 |
| Example 22 | Compound 19 | 27.3 | 1.85 | 52.8 | 4,040 | 218 | 7.1 | 94.7 | 11,900 | 311 |
| Example 23 | Compound 20 | 30.1 | 1.94 | 50.6 | 5,116 | 264 | 6.9 | 94.7 | 11,800 | 317 |
| Example 24 | Compound 21 | 33.7 | 1.77 | 50.4 | 3,163 | 179 | 5.9 | 95.3 | 12,400 | 320 |
| Comparative Example No.2 | Compound 22 | 38.6 | 2.16 | 53.8 | 4,215 | 195 | 7.1 | 87.3 | 9,4400 | 258 |

Table 2-continued

| Example or Comparative Example No. | Compounds Kind | Amount (g) | Catalytic Components Ti Content[1] | Amount (mg) | Polymerization Activities (A)[2] | (B)[3] | M.F.I. g/10 min. | H.R. (%) | Stiffness (kg/cm$^2$) | Tensile Yield Strengths (kg/cm$^2$) |
|---|---|---|---|---|---|---|---|---|---|---|
| Example No. 3 | Compound 23 | 29.3 | 2.22 | 52.7 | 3,860 | 174 | 5.9 | 86.4 | 91,00 | 247 |

[1] Content of titanium atom (% by weight)
[2] g/g - Catalytic component·hr
[3] kg/g - Ti·hr.

EXAMPLE 25

(A) Preparation of a catalytic component (C)

A catalytic component was prepared by the same procedure as in Example 1 (A), except that the compound (1) used in the preparation of the catalytic components in Example 1 (A) was replaced by 33.7 g of diethyl ether (hereinafter referred to as a "compound (24)") and that toluene was replaced by 50 ml of n-heptane. Then, the catalytic component was purified by the same procedure as in Example 1 (A) (hereinafter referred to as a "catalytic component(C)") except that toluene used in example 1(A) was replaced by n-hexane. The titanium atom content of the catalytic component (C) was 3.8% by weight.

(B) Polymerization of propylene and the mechanical properties of the polymer.

Propylene was polymerized by the same procedure as in Example 1 (B), except that the catalytic component (A) used in the polymerization of propylene in Example 1 (B) was replaced by 58.0 mg of the catalytic component (C). Then, the gas present inside the autoclave was released, and therefore, the polymerization was terminated to afford 386 g of polypropylene powder. Therefore, the polymerization activity was 6,480 g/g-catalytic component (C)·hr, and 196 kg/g-Ti·hr. H.R. of the polypropylene obtained was 96.1%. Pellets were prepared under the same conditions as in Example 1 (B). The whiteness and transparency of the pellets were similar to those of conventional polypropylene.

M.F.I. of the pellets obtained was 5.6 g/10 minutes. The stiffness of a press-formed plate of the pellets was 12,800 kg/cm$^2$ and its tensile yield strength was 345 kg/cm$^2$. Therefore, the polypropylene obtained showed good mechanical properties.

EXAMPLE 26

A catalytic component was prepared by the same process as in Example 25(A) except that the compound (C) employed in preparation of the catalytic component (C) in Example 25 (A) was replaced by 6.0 g of the benzoyl bromide (The catalytic component was hereinafter referred to as a "Catalytic Component (D)"). The titanium content of the catalytic component obtained was 2.8% by weight.

Propylene was polymerized by the same procedure as in Example 25 (B), except that the catalytic component (C) used in the polymerization of propylene in Example 25 (B) was replaced by 57.2 mg of the catalytic component (D).

Consequently, 389 g of polypropylene powder was obtained. Therefore, the polymerization activity was 6,800 g/g-catalytic component (A)·hr, and 243 kg/g-Ti·hr. H.R. of the polypropylene obtained was 96.3%. Pellets were prepared under the same conditions as in Example 1 (B). The whiteness and transparency of the pellets obtained were similar to those of conventional polypropylene.

M.F.I. of the pellets obtained was 7.3 g/10 minutes. The stiffness of a press-formed plate of the pellets was 13,000 kg/cm$^2$ and its tensile yield strength was 348 kg/cm$^2$.

COMPARATIVE EXAMPLE 5

A catalytic component was prepared by the same procedure as in Example 25 (A), except that benzoyl chloride used in the preparation of the catalytic component (C) in Example 25 (A) was not used. The titanium content of the catalytic component was 2.0% by weight.

Propylene was polymerized by the same procedure as in Example 25 (B), except that the catalytic component (C) used in the polymerization in Example 25 (B) was replaced by 50.0 mg of the catalytic component. In consequence, 46 g of polypropylene powder was obtained. The polymerization activity was 920 g/g-catalytic component·hr, 46 kg/g-Ti·hr and H.R. of this polypropylene powder was 83.8%.

COMPARATIVE EXAMPLES 6 AND 7

A 500 ml flask filled with nitrogen gas was charged with 15 g of the catalytic component which had been obtained as in Comparative Example 1. Then, 50 ml of n-heptane and 0.63 g of diethyl ether were added. These mixed ingredients were stirred at in a temperature 65° C. for 2 hours. The solid component was separated by filtration, and washed with n-hexane, and then dried at 40° C. under reduced pressure to afford a catalytic component (titanium atom content was 2.3% by weight).

Propylene was polymerized by the same procedure as in Example 25 (B), except that the catalytic component (C) used in the polymerization of propylene in Example 25 (B) was replaced by 43,8 mg of this catalytic component. Consequently, 256 g of polypropylene powder was obtained. Therefore, the polymerization activity was 5,840 g/g-catalytic component·hr, and 254 kg/g-Ti·hr. H.R. of the polypropylene was 85.2%. Pellets were formed under the same conditions as in Example 25. The whiteness and transparency of the pellets were similar to those of conventional polypropylene. M.F.I. of the pellets was 8.8 g/10 minutes. The stiffness of a press-formed plate of the pellets was 9,100 kg/cm$^2$ and their tensile yield strength was 254 kg/cm$^2$ (Comparative Example 6).

Though the amount of diethyl ether above was increased to 12 g, the polymerization activity was 3,720 g/g-catalytic component·hr., and 189 kg/g-Ti·hr. H.R. of the pellets was 83.7% (Comparative Example 7).

COMPARATIVE EXAMPLES 8 AND 9

Anhydrous magnesium dichloride and benzoyl chloride were copulverized under the same conditions as in the copulverization of Example 1(A). A 500 ml flask filled with nitrogen gas was charged with 15 g of the copulverization product obtained. Then, 50 ml of n-heptane and 0.63 g of diethyl ether were added to the charged mass, and they were mixed with stirring at 65° C. for 2 hours. The solid component was separated by filtration, washed with n-hexane, then 50 ml of n-heptane and 86.3 g of titanium tetrachloride were added, and stirred at 65° C. for two hours, then the resulting solid component was separated by filtration, and dried at a temperature of 40° C. under reduced pressure to afford a catalytic component having a titanium content of 2.5% by weight.

Propylene was polymerized by the same procedure as in Example 25 (B), except that the catalytic component (C) used in the polymerization of propylene in Example 25 was replaced by 46.7 mg of the catalytic component. Consequently, 329 g of polypropylene powder was obtained. Therefore, the polymerization activity was 7,040 g/g-catalytic component·hr, and 282 kg/g-Ti·hr. H.R. of the polypropylene was 89.8%. Pellets were prepared in the same manner as in Example 1 (B). The whiteness and transparency of the pellets were similar to those of conventional polypropylene. M.F.I. of the pellets was 7.3 g/10 minutes. The stiffness of a press-formed plate of the pellets was 10,000 kg/cm$^2$ and its tensile yield strength was 282 kg/cm$^2$. (Comparative Example 8)

Though the amount of diethyl ether was increased to 12 g, the polymerization activity was 7370 g/g-catalytic component·hr, and 263 kg/g-Ti·hr. H.R. of the pellets was 89.6% (Comparative Example 9).

COMPARATIVE EXAMPLES 10-13

A 300 ml-flask filled with nitrogen gas was charged with 15 g of anhydrous pulverized magnesium dichloride, 4.5 g of benzoyl chloride and 50 ml of n-heptane. These ingredients were stirred (were not copulverized) for 8 hours at 65° C. The solid component was separated by filtration and washed with n-heptane to afford a the catalyst carrier. A catalytic component was prepared using the carrier by same procedure as in example 25(A) (Comparative Example 10).

A catalytic component was prepared by the same procedure as in Example 25 (A), except that diethyl ether was replaced by 63.9 g of benzoyl chloride, and that n-heptane and n-hexane were replaced by an equal amount of toluene, respectively (Comparative Example 11).

A catalytic component was prepared by the same procedure as in Example 25 (A), except that benzoyl chloride used in Example 25 (A) was replaced by 6.0 g of dibutyl ether (Comparative Example 12).

A catalytic component was prepared by the same procedure as in Example 25 (A), except that anhydrous magnesium dichloride used in Example 25 (A) was replaced by an equal amount of magnesium oxide (Comparative Example 13).

Propylene was polymerized by the same polymerization procedures as in Example 25 (B) except that the respective catalytic components obtained as described above and shown in Table 3 were used in place of the catalytic component (C) used in Example 25 (B). The results are set forth in Table 3.

Table 3

| Comparative Example No. | Catalytic Components Amount (mg) | Amount of polymer obtained(g) | Polymerization[1] Activities | H.R. (%) |
|---|---|---|---|---|
| 10 | 44.1 | 33 | 748 | 88.5 |
| 11 | 46.5 | 64 | 1,380 | 86.8 |
| 12 | 63.9 | 33 | 516 | 83.2 |
| 13 | 49.2 | 2[2] | 41 | — |

[1] g/g-catalytic component·hr
[2] polymer with rather low crystallinity

COMPARATIVE EXAMPLES 14 AND 15

20 g of anhydrous magnesium dichloride, 6.0 g of benzoyl chloride and 1.1 g of diethyl ether were copulverized under the same conditions as in the preparation of the copulverized mass in Example 25 (A). The copulverization product obtained was reacted with 86.3 g of titanium tetrachloride in 50 ml of n-heptane and stirred at 65° C. for two hours, and then, washed and dried.

Propylene was polymerized by the same procedure as in Example 25 (B), except that the catalytic component (C) used in the polymerization of propylene in Example 25 (B) was replaced by 52.4 mg of the catalytic component (titanium content was 2.9% by weight). Consequently, 273 g of polypropylene powder was obtained. Therefore, the polymerization activity was 5,210 g/g-catalytic component·hr and was 178 kg/g-Ti·hr. H.R. of the polypropylene was 87.6%. Pellets were prepared under the same conditions as in Example 1 (B).

M.F.I. of the pellets obtained was 3.8 g/10 minutes. The stiffness of a press-formed plates of the pellets was 9,100 kg/cm$^2$ and its tensile yield strength was 256 kg/cm$^2$ (Comparative Example 14).

A catalytic component was prepared by the same procedure as in Comparative Example 14, except that the amount of diethyl ether was changed to 3.2 g.

Propylene was polymerized by the same procedure as in Comparative Example 14, except that the catalytic component used in the polymerization of propylene in Comparative Example 14 was replaced by an equal amount of this catalytic component. Then, pellets were prepared under the same conditions as in Example 1 (B). The polymerization activity was 3,810 g/g-catalytic component·hr, and 123 kg/g-Ti·hr.

H.R. of the polypropylene obtained thus was 91.2%, and M.F.I. of the pellets was 3.4 g/10 minutes. The stiffness of a press-formed plate of the pellets was 10,300 kg/cm$^2$ and its tensile yield strength was 281 kg/cm$^2$ (Comparative Example 15).

COMPARATIVE EXAMPLES 16 AND 17

5.3 ml of the solution obtained by reacting 86.3 g of titanium tetrachloride and 33.7 g of diethyl ether in 50 ml of n-heptane at room temperature, and 20 g of anhydrous magnesium dichloride were copulverized under the same conditions as in Example 25 (A). The titanium content of the catalytic component was 3.3% of weight.

Propylene was polymerized by the same procedure as in Example 25 (B), except that the catalytic component (C) used in Example 25 (B) was replaced by 52.9 mg of the catalytic component. Consequently, 395 g of polypropylene powder was obtained. Therefore, the polymerization activity was 7,470 g/g-catalytic componen-t·hr., and 226 kg/g-Ti·hr. H.R. of the polypropylene was 83.2%. Then, pellets were prepared under the same conditions as in Example 25 (B). The whiteness and transparency of the pellets were similar to those of conventional polypropylene. The stiffness of a press-formed plates was 10,000 kg/cm$^2$ and its tensile yield strength was 257 kg/cm$^2$ (Comparative Example 16).

EXAMPLE 27

A catalytic component was prepared by the same procedure as in Example 25 (A), except that diethyl ether used in the production of the catalytic component in Example 25 (A) was replaced by 49.2 g of anisole. The titanium content of the catalytic component was 4.0% by weight.

Propylene was polymerized by the same procedure as in Example 25 (B), except that the catalytic component (C) used in the polymerization of propylene in Example 25 (B) was replaced by 52.7 mg of this catalytic component. Consequently, 392 g of polypropylene powder was obtained. Therefore, the polymerization activity was 7,440 g/g-catalytic component·hr. and was 186 kg/g-Ti·hr. H.R. of the polypropylene was 97.0%. Pellets were prepared under the same conditions as in Example 1 (B). The whiteness and transparency of the pellets were similar to those of conventional polypropylene.

M.F.I. of the pellets was 7.3 g/10 minutes. The stiffness of a press-formed plate of the pellets was 13,300 kg/cm$^2$ and its tensile yield strength was 354 kg/cm$^2$. Therefore, the polypropylene showed excellent mechanical properties.

EXAMPLE 28

A catalytic component was prepared by the same procedure as in Example 25 (A), except that diethyl ether used in the production of the catalytic component (C) in Example 25 (A) was replaced by 59.2 g of di-n-butyl ether. The titanium conetent of the catalytic component obtained was 2.6% by weight.

Propylene was polymerized by the same procedure as in Example 25 (B), except that the catalytic component (C) used in the polymerization of propylene in Example 25 (B) was replaced by 49.7 mg of the catalytic component. Consequently, 270 g of polypropylene powder was obtained. Therefore, the polymerization activity was 5,430 g/g-catalytic component (A)·hr and was 209 kg/g-Ti·hr. H.R. of the polypropylene was 95.8%. Then, pellets were prepared under the same conditions as in Example 1 (B).

M.F.I. of the pellets was 5.6 g/10 minutes. The stiffness of a press-formed plate of the pellets was 12,200 kg/cm$^2$ and its tensile yield strength was 321 kg/cm$^2$. Therefore, the polypropylene showed excellent mechanical properties.

EXAMPLE 29

A catalytic component was prepared by the same procedure as in Example 25 (A), except that diethyl ether used in the production of the catalytic component in Example 25 (A) was replaced by 77.4 g of diphenyl ether. The titanium content of the catalytic component was 3.1% by weight.

Propylene was polymerized by the same procedure as in Example 25 (B), except that the catalytic component (C) used in the polymerization of propylene in Example 25 (B) was replaced by 52.7 mg of the catalytic component as described above. Consequently, 221 g of polypropylene powder was obtained. Therefore, the polymerization activity was 4,900 g/g-catalytic component·hr and 158 kg/g-Ti·hr. H.R. of the polypropylene obtained was 94.3%. Pellets were prepared under the same conditions as in Example 1 (B).

M.F.I. of the pellets obtained was 6.2 g/10 minutes. The stiffness of press-formed plates of the pellets was 12,100 kg/cm$^2$ and its tensile yield strength was 317 kg/cm$^2$. Therefore, the polypropylene showed excellent mechanical properties.

EXAMPLE 30

(A) Preparation of a catalytic component (E)

A catalytic component was prepared by the same procedure as in Example 1 (A), except that the compound (1) employed in the preparation of the catalytic component (A) in Example 1 (A) was replaced by 23.5 g of n-butyl nitrite (hereinafter referred to as "compound (25)"). The titanium atom content of the catalytic component hereinafter referred to as a "catalytic component (E)" was 2.46% by weight.

(B) Polymerization of propylene and the mechanical properties of the polypropylene Propylene was polymerized by the same procedure as in Example 1 (B), except that the catalytic component (A) used in the polymerization of propylene in Example 1 (B) was replaced by 62.5 mg of the purified catalytic component (E). Then the gas inside the autoclave were released, and therefore, the polymerization was terminated to afford 263 g of polypropylene powder. Therefore, the polymerization activity was 4,208 g/g-catalytic component (E)·hr and was 171 kg/g-Ti·hr. H.R. of the polypropylene obtained was 96.1%. Pellets were prepared by the same procedure as in Example 1 (B).

M.F.I. of the pellets was 8.4 g/10 minutes. The stiffness of a press-formed plate of the pellets was 13,300 kg/cm$^2$ and its tensile yield strength was 342 kg/cm$^2$. Therefore, the polypropylene showed excellent mechanical properties.

EXAMPLE 31-38

Catalytic components were prepared by the same procedure as in Example 30 (A), except that 23.5 g of the compound (25) used in the production of the catalytic components in Example 30 (A) was replaced by the varing amounts of the compound (25), isoamyl nitrite (hereinafter referred to as a "compound (26)"), diethyl sulfite (hereinafter referred to as a "compound (27)") or dimethyl sulfite (hereinafter referred to as a "compound (28)").

Propylene was polymerized by the same procedure as in Example 30 (B), except that the catalytic component (E) used in Example 30 (B) was replaced by the catalytic components which were prepared as described above. Then, pellets of the polypropylene powder and press-formed plates were prepared by the same procedure as in Example 1 (B). The polymerization activities, the H.R. of polypropylene powder, the M.F.I. of the pellets and the stiffness and the tensile yield strength of the press-formed plates are set forth in Table 4 below.

Table 4

| Example No. | Compounds Kind | Amount (g) | Catalytic Components Ti Content[1] | Amount (mg) | Polymerization Activities (a)[2] | (B)[3] | M.F.I. g/10 min. | H.R. (%) | Stiffness (kg/cm$^2$) | Tensile Yield Strengths (kg/cm$^2$) |
|---|---|---|---|---|---|---|---|---|---|---|
| Example 31 | Compound 25 | 11.7 | 2.14 | 51.7 | 3,962 | 185 | 7.6 | 95.8 | 13.1 × 10$^3$ | 386 |
| Example 32 | Compound 26 | 26.6 | 2.52 | 50.4 | 4,020 | 160 | 6.7 | 96.4 | 13.2 × 10$^3$ | 340 |
| Example 33 | Compound 26 | 17.8 | 2.31 | 55.3 | 4,116 | 178 | 6.3 | 95.7 | 12.8 × 10$^3$ | 388 |
| Example 34 | Compound 26 | 8.9 | 2.03 | 52.5 | 3,655 | 180 | 6.8 | 95.2 | 12.4 × 10$^3$ | 320 |
| Example 35 | Compound 27 | 62.9 | 2.01 | 52.2 | 5,462 | 272 | 7.9 | 95.9 | 12.8 × 10$^3$ | 327 |
| Example 36 | Compound 27 | 1.4 | 1.92 | 53.9 | 4,713 | 245 | 8.3 | 94.8 | 12.1 × 10$^3$ | 324 |
| Compound 37 | Compound 28 | 25.0 | 2.22 | 54.8 | 4,219 | 190 | 7.2 | 95.2 | 12.5 × 10$^3$ | 328 |
| Example 38 | Compound 28 | 12.5 | 1.87 | 53.6 | 4,056 | 217 | 7.1 | 94.4 | 12.0 × 10$^3$ | 317 |

[1] Content of titanium atom (% by weight)
[2] g/g · Catalytic component·hr
[3] kg/g · Ti·hr

EXAMPLE 39

(A) Preparation of a catalytic component (F)

A catalytic component was prepared by the same procedure as in Example 1 (A), except that the compound (1) used in the production of the catalytic component (A) in Example 1 (A) was replaced by 21.0 g of ethyl alcohol (hereinafter referred to as a "compound (29)"). The titanium atom content of the catalytic component hereinafter referred to as a "catalytic component (F)") was 1.02% by weight.

(B) Polymerization of propylene and the mechanical properties of the polypropylene Propylene was polymerized by the same procedure as in Example 1 (B), except that the catalytic component (A) used in the polymerization of propylene in Example 1 (B) was replaced by 62.4 mg of the catalytic component (F). Then, the gas present inside the autoclave was released and the polymerization was terminated to afford 221 g of polypropylene powder. Therefore, the polymerization activity was 3,540 g/g-catalytic component (F)·hr and 347 kg/g-Ti·hr. H.R. of the polypropylene was 97.4%. Pellets were prepared by the same procedure as in Example 1 (B).

M.F.I. of the pellets was 5.6 g/10 minutes. The stiffness of a press-formed plate of the pellets was 13,400 kg/cm$^2$ and its tensile yield strength was 341 kg/cm$^2$. Therefore, the polypropylene showed excellent mechanical properties.

EXAMPLES 40-46

The same procedure for preparing the catalytic component as in Example 39 (A) was followed except that the compound (29), propylene glycol (hereinafter referred to as a "compound (30)"), n-butyl alcohol (hereinafter referred to as a "compound (31)"), cyclohexanol (hereinafter referred to as a "compound (32)"), stearyl alcohol (hereinafter referred to as a "compound (33)"), tert-butyl alcohol (hereinafter referred to as a "compound (34)") or m-cresol (hereinafter referred to as a "compound (35)") shown in Table 5 were used in place of the compound (29) as the alcohol compound or the phenol compound used in the preparation of the catalytic component (F) in Example 39 (A).

Propylene was polymerized under the same conditions as in Example 39 (B), except that the amounts of the catalytic components were changed as shown in Table 5. Pellets of the polypropylene powder and press-formed plates were prepared by the same procedure as in Example 39 (B). The polymerization activities, H.R. of the polypropylene powder, the M.F.I. of the pellets and the stiffness and the tensile yield strength of the press-formed plates are set forth in Table 5 below.

Table 5

| Example No. | Compounds Kind | Amount (g) | Catalytic Components Ti Content[1] | Amount (mg) | Polymerization Activities (A)[2] | (B)[3] | M.F.I. g/10 min. | H.R. (%) | Stiffness (kg/cm$^2$) | Tensile Yield Strengths (kg/cm$^2$) |
|---|---|---|---|---|---|---|---|---|---|---|
| Example 40 | Compound 29 | 12.5 | 1.41 | 58.4 | 3,720 | 264 | 5.7 | 96.8 | 13.1 × 10$^3$ | 339 |
| Example 41 | Compound 30 | 17.3 | 1.72 | 60.7 | 3,867 | 225 | 6.8 | 94.2 | 12.2 × 10$^3$ | 314 |
| Example 42 | Compound 31 | 33.7 | 2.14 | 53.7 | 3,542 | 166 | 7.2 | 95.3 | 12.7 × 10$^3$ | 327 |
| Example 43 | Compound 32 | 45.6 | 1.66 | 59.2 | 4,116 | 248 | 4.9 | 94.8 | 12.4 × 10$^3$ | 320 |
| Example 44 | Compound 33 | 123.1 | 1.85 | 60.1 | 3,270 | 177 | 6.6 | 94.5 | 12.0 × 10$^3$ | 321 |
| Example 45 | Compound 34 | 61.1 | 2.40 | 56.8 | 5,745 | 239 | 8.2 | 94.6 | 12.4 × 10$^3$ | 323 |
| Example 46 | Compound 35 | 49.2 | 2.03 | 57.3 | 3,398 | 167 | 7.4 | 94.3 | 12.3 × 10$^3$ | 318 |

[1] % by weight
[2] g/g-Catalytic component·hr
[3] kg/g-Ti·hr

EXAMPLES 47-50, Comparative Examples 18-23

Catalytic components were prepared by the same procedure as in Example 1 (A), except that benzoyl chloride (hereinafter referred to as a "compound (a)") used in the preparation of the copulverization product in Example 1 (A) was replaced by benzoyl bromide (hereinafter referred to as a "compound (b)"), trichloroacetyl chloride (hereinafter referred to as a "compound (c)"), p-chloro benzoyl chloride (hereinafter referred to as a "compound (d)"), p-methoxy benzoyl chloride (hereinafter referred to as a "compound (e)"), benzaldehyde (hereinafter referred to as a "compound (f)"), acetophenone (hereinafter referred to as a "compound (g)"), methyl benzoate (hereinafter referred to as a "compound (h)"), N,N-dimethylbenzamide (hereinafter referred to as a "compound (i)") or benzyl alcohol (hereinafter referred to as a "compound (j)") (the amount of each compound is set forth in Table 6 below).

Propylene was polymerized under the same conditions as in Example 1 (B), except that the catalytic component (A) used in the polymerization of propylene in Example 1 (B) was replaced by the respective catalytic components thus obtained and press-formed plates were prepared by the same procedure as in Example 1 (B). The polymerization activities, the H.R. of the polypropylene powder, the M.F.I. of the pellets and mechanical properties of the pressed-formed plates are set forth in Table 6 below.

nent as described above. Consequently, 254 g of a polypropylene powder was obtained. Therefore, the polymerization activity was 407 g/g-catalytic component·hr and 29 kg/g-Ti·hr. H.R. of the polypropylene obtained was 89.3%. Pellets of the polypropylene and press-formed plates were prepared by the same procedure as in Example 1 (B).

M.F.I. of the pellets was 7.2 g/10 minutes. The stiffness of a press-formed plate of the pellet was 10,300 kg/cm$^2$ and its tensile yield strength was 280 kg/cm$^2$.

Table 6

| Example or Comparative Example No. | Compounds Kind | Amount (g) | Catalytic Components Ti Content | Amount (mg) | Polymerization Activities (A)[2] | (B)[3] | M.F.I. g/10 min. | H.R. (%) | Stiffness (kg/cm$^2$) | Tensile Yield Strengths (kg/cm$^2$) |
|---|---|---|---|---|---|---|---|---|---|---|
| Example 47 | Compound b | 6.0 | 1.52 | 43.7 | 6,243 | 411 | 7.6 | 96.3 | 12,800 | 334 |
| Example 48 | Compound c | 4.0 | 1.78 | 50.6 | 3,627 | 204 | 4.2 | 94.2 | 11,700 | 317 |
| Example 49 | Compound d | 5.0 | 2.06 | 52.2 | 4,226 | 205 | 6.7 | 94.8 | 12,400 | 323 |
| Example 50 | Compound e | 8.0 | 1.93 | 51.6 | 3,210 | 166 | 8.3 | 94.4 | 11,600 | 320 |
| Comparative Example No.18 | — | 0 | — | 51.0 | 957 | — | 13.6 | 84.2 | 9,300 | 251 |
| Comparative Example No.19 | Compound f | 6.0 | 1.76 | 60.3 | 1,164 | 66 | 6.2 | 90.2 | 10,200 | 278 |
| Comparative Example No.20 | Compound g | " | 2.12 | 50.8 | 1,486 | 70 | 4.3 | 87.5 | 9,800 | 262 |
| Comparative Example No.21 | Compound h | " | 2.43 | 48.2 | 1,920 | 79 | 5.5 | 93.1 | 11,200 | 305 |
| Comparative Example No.22 | Compound i | " | — | 49.7 | 0 | 0 | — | — | — | — |
| Comparative Example No.23 | Compound j | " | — | 50.5 | 612 | — | 8.1 | 85.3 | 8,700 | 243 |

[1] Content of titanium atom (% by weight)
[2] g/g-Catalytic component·hr
[3] kg/g-Ti·hr

EXAMPLE 51

To 13 g of the copulverization product formed between anhydrous magnesium dichloride and benzoyl chloride, employed in the preparation of the catalytic component (A) was added a reaction product of titanium tetrachloride with triphenylphosphate, and they were copulverized for 1 hour. The titanium content of the copulverization product (catalytic component) was 1.41% by weight.

Propylene was polymerized by the same procedure as in Example 1 (B) except that the catalytic component (A) used in Example 1 (B) was replaced by 52.2 mg of the catalytic component thus obtained. Consequently, 200 g of a polypropylene powder was obtained. Therefore, the polymerization activities was 3,831 g/g-catalytic component (A)·hr and 271 kg/g-Ti·hr. H.R. of the polypropylene was 94.9%. Pellets were prepared by the same manner in Example 1 (B).

M.F.I. of the pellets was 6.7 g/10 minutes. The stiffness of a press-formed plate of the pellets was 12,100 kg/cm$^2$ and its tensile yield strength was 320 kg/cm$^2$.

COMPARATIVE EXAMPLE 24

Into the same vessel for the vibrating ball mill which was used in Example 1 (A) were placed 10 g of anhydrous magnesium dichloride, 3 g of benzoyl chloride, 0.80 g of titanium tetrachloride and 0.46 g of triphenyl phosphate (that is, equal amount of four components used in the preparation of the copulverization product in Example 51) in this order. Then, these ingredients were copulverized for 8 hours.

Propylene was polymerized by the same procedure as in Example 1 (B), except that the catalytic component (A) used in the polymerization of propylene in Example 1 (B) was replaced by 624 mg of the catalytic component as described above. Consequently, 254 g of a polypropylene powder was obtained. Therefore, the polymerization activity was 407 g/g-catalytic component·hr and 29 kg/g-Ti·hr. H.R. of the polypropylene obtained was 89.3%. Pellets of the polypropylene and press-formed plates were prepared by the same procedure as in Example 1 (B).

EXAMPLE 52

Propylene was polymerized by the same procedure as in Example 1 (B), except that ethyl benzoate used in the polymerization of propylene in Example 1 (B) was replaced by 0.33 g of ethyl anisate. Consequently, 375 g of polypropylene powder was obtained. Therefore, the polymerization activity was 6,240 g/g-catalytic component (A)·hr. H.R. of the polypropylene was 96.0%. Pellets of the polypropylene and a press-formed plate were prepared by the same procedure as in Example 1 (B).

M.F.I. of the pellets was 8.3 g/10 minutes. The stiffness of the press-formed plates of the pellets was 12,600 kg/cm$^2$.

EXAMPLES 53-57, Comparative Examples 25-30

Catalytic components were prepared by the same procedure as in Example 13 (A), except that the compound (a) used in the preparation of the copulverization product in Example 13 (A) was replaced by varying amounts of the compound (a), the compound (b), the compound (c), the compound (d), the compound (e), the compound (f), the compound (g), the compound (h), the compound (i) or the compound (j), (the amount was set forth in Table 7 below).

Propylene was polymerized under the same conditions as in Example 13 (B), except that the catalytic component (B) used in the polymerization of propylene in Example 13 (B) was replaced by the respective catalytic components thus obtained. Then, pellets of the respective polypropylene powder obtained and press-formed plates were prepared by the same procedure as in Example 1 (B). The polymerization activities, the H.R. of the polypropylene powder, the M.F.I. of the pellets and mechanical properties of the press-formed plates are set forth in Table 7 below.

kg/cm². The tensile yield strength of the press-formed plate was 276 kg/cm².

Table 7

| Example or Comparative Example No. | Compounds Kind | Amount (g) | Catalytic Components Ti Content[1] | Amount (mg) | Polymerization Activities A[2] | (B)[3] | M.F.I. g/10 min. | H.R. (%) | Stiffness (kg/cm²) | Tensile Yield Strengths (kg/cm²) |
|---|---|---|---|---|---|---|---|---|---|---|
| Example 53 | Compound a | 3.0 | 1.97 | 57.3 | 3,822 | 194 | 6.4 | 96.2 | 13.1 × 10³ | 334 |
| Example 54 | Compound b | 6.0 | 2.32 | 55.4 | 4,890 | 210 | 7.6 | 96.4 | 13.3 × 10³ | 339 |
| Example 55 | Compound c | 4.0 | 1.86 | 56.2 | 3,746 | 201 | 5.4 | 94.4 | 11.9 × 10³ | 318 |
| Example 56 | Compound d | 5.0 | 2.01 | 2.2 | 3,237 | 161 | 6.3 | 94.8 | 12.3 × 10³ | 323 |
| Example 57 | Compound e | 8.0 | 1.77 | 53.4 | 3,061 | 173 | 5.7 | 95.1 | 12.3 × 10³ | 320 |
| Comparative Example 25 | — | — | 2.16 | 51.1 | 1,087 | 50 | 12.1 | 85.4 | 8.8 × 10³ | 252 |
| Comparative Example 26 | Compound f | 6.0 | 1.91 | 3.2 | 1,293 | 68 | 5.5 | 91.2 | 10.6 × 10³ | 284 |
| Comparative Example 27 | Compound g | " | 2.33 | 52.6 | 1,660 | 71 | 7.1 | 89.3 | 10.1 × 10³ | 270 |
| Comparative Example 28 | Compound h | " | 2.16 | 51.4 | 2,164 | 100 | 6.4 | 92.8 | 11.3 × 10³ | 301 |
| Comparative Example 29 | Compound i | " | — | 57.6 | 0 | 0 | — | — | — | — |
| Comparative Example 30 | Compound j | " | — | 56.0 | 1,006 | — | 7.5 | 84.6 | 8.4 × 10³ | 240 |

[1] Content of titanium atom (% by weight)
[2] g/g - Catalytic component·hr
[3] kg/g · Ti·hr

EXAMPLE 58

To 13 g of the copulverization product formed between anhydrous magnesium dichloride and benzoyl chloride employed in the preparation of the catalytic component (B) was added the reaction product of titanium tetrachloride with dimethylmethoxysilane. These ingredients were copulverized for 1 hour. The titanium content of the copulverization product (catalytic component) was 2.36% by weight.

Propylene was polymerized by the same procedure as in Example 13 (B), except that the catalytic component (B) used in Example 13 (B) was replaced by 54.9 mg of the catalytic component thus obtained. Consequently, the polymerization activity was 3,461 g/g-catalytic component·hr, and 147 kg/g-Ti·hr. Pellets and press-formed plates were prepared under the same conditions as in Example 1 (B). M.F.I. of the pellets was 6.8 g/10 minutes. The stiffness of the press-formed plates was 12,000 kg/cm², and their tensile yeild strength was 316 kg/cm².

COMPARATIVE EXAMPLE 31

Into the same vessel for a vibrating ball mill which was used in Example 1 (A) were placed 10 g of anhydrous magnesium dichloride, 3 g of benzoyl chloride 1.31 g of titanium tetrachloride and 0.44 g of dimethyldimethoxysilane (that is, equal amounts of the four components used in preparing the copulverization product in Example 58) in this order. Then, the copulverization was carried out for 8 hours.

Propylene was copolymerized by the same procedure as in Example 13 (B), except that the catalytic component (B) used in the polymerization of propylene in Example 13 (B) was replaced by the catalytic component as described above. The polmerization activity was 512 g/g-catalytic component·hr and was 22 kg/g-Ti·hr. H.R. of the polypropylene was 88.6%. Pellets of the polypropylene obtained and press-formed plates of the pellets were prepared by the same procedure in Example 1 (B). M.F.I. of the pellets was 6.8 g/10 minutes. The stiffness of the press-formed plate was 10,000

EXAMPLE 59

Propylene was polymerized by the same procedure as in Example 13 (B), except that ethyl benzoate used in the polymerization of propylene in Example (B) was replaced by 0.33 g of ethyl anisate. The polymerization activity was 3,880 g/g-catalytic component·hr. H.R. of the polypropylene powder was 95.2%. Pellets of the polypropylene were prepared by the same procedure in Example 1 (B). M.F.I. of the pellets was 6.7 g/10 minutes. The stiffness of press-formed plates of the pellets was 12,400 kg/cm².

EXAMPLES 60-62, COMPARATIVE EXAMPLES 32-41

Catalytic components were prepared by the same procedure as in Example 25 (A), except that the compound (a) used in the preparation of the copulverization product in Example 25 (A) was replaced by varing amounts of the compound (a), the compound (b), the compound (c), the compound (d), the compound (e), the compound (f), the compound (g), ethyl benzoate (hereinafter referred to as a "compound (m)"), the compound (i), the compound (j) or acetyl chloride (hereinafter referred to as a "compound (k)") (the amount was set forth in Table 8 below).

Propylene was polymerized under the same conditions as in Example 25 (B), except that the catalytic component (C) used in the polymerization of propylene in Example 25 (B) was replaced by the respective catalytic components thus obtained. Then, pellets of the respective polypropylene powders and press-formed plates were prepared by the same procedure as in Example 1 (B). The results are shown in Table 8 below (Examples 60-62, Comparative Examples 32-36).

Catalytic components were prepared by the same procedures as in Comparative Examples 32-36, except that ethyl ester used in the preparation of the catalytic components in Comparative Examples 32-36 was not used. Propylene was polymerized by the same procedure as in Comparative Examples 32-36, except that the catalytic components in the polymerization of propylene in Comparative Examples 32-36 were replaced by the above catalytic components. Their results are set forth in Table 8. (Comparative Examples 37-41).

nent as described above. Consequently, 180 g of polypropylene powder was obtained. Therefore, the poly-

Table 8

| Example or Comparative Example No. | Compounds Kind | Compounds Amount (g) | Catalytic Components Ti Content[1] | Catalytic Components Amount (mg) | Polymerization Activities (A)[2] | Polymerization Activities (B)[3] | M.F.I. g/10 min. | H.R. (%) | Stiffness (kg/cm$^2$) | Tensile Yield Strengths (kg/cm$^2$) |
|---|---|---|---|---|---|---|---|---|---|---|
| Example 60 | Compound k | 7.0 | 2.9 | 53.9 | 5,010 | 173 | 5.1 | 95.2 | 12,200 | 316 |
| Example 61 | Compound c | " | 2.4 | 47.6 | 3,110 | 130 | 4.65 | 94.2 | 11,700 | 309 |
| Example 62 | Compound d | 8.0 | 3.4 | 56.8 | 5,920 | 174 | 6.9 | 95.9 | 13,000 | 338 |
| Comparative Example 32 | Compound f | 6.0 | 9.2 | 46.1 | 1,300 | 14 | 7.5 | 91.4 | 10,800 | 297 |
| Comparative Example 33 | Compound g | " | 8.7 | 52.4 | 1,830 | 21 | 7.0 | 87.6 | — | — |
| Comparative Example 34 | Compound m | " | 2.5 | 46.3 | 1,900 | 75 | 8.3 | 93.4 | 11,600 | 306 |
| Comparative Example 35 | Compound i | " | — | 50.3 | 0 | 0 | — | — | — | — |
| Comparative Example 36 | Compound j | " | 3.1 | 52.6 | 550 | 18 | 8.7 | 84.3 | — | — |
| Comparative Example 37 | Compound f | " | 5.4 | 48.9 | 2,140 | 40 | 6.9 | 83.7 | — | — |
| Comparative Example 38 | Compound g | " | — | 42.7 | <200 | >2 | — | — | — | — |
| Comparative Example 39 | Compound m | " | 2.3 | 40.4 | 5,590 | 248 | 4.1 | 91.8 | 11,000 | 292 |
| Comparative Example 40 | Compound i | " | — | 52.6 | 0 | 0 | — | — | — | — |
| Comparative Example 41 | Compound j | " | 3.2 | 50.1 | 4,640 | 146 | 9.2 | 77.9 | — | — |

[1] Content of titanium atom (% by weight)
[2] g/g - Catalytic component·hr
[3] kg/g - Ti·hr

EXAMPLE 63

A catalytic component was prepared by the same procedure as in Example 25 (A), except that titanium tetrachloride employed in the preparation of the catalytic component (C) in Example 25 (A) was replaced by 90.7 g of ethoxy titanium trichloride. The titanium content of the catalytic component was 3.1% by weight.

Propylene was polymerized by the same procedure as in Example 25 (B), except that the catalytic component (C) used in the polymerization of propylene in Example 25 (B) was replaced by 50.2 mg of the catalytic component thus obtained. Consequently, 264 g of polypropylene powder was obtained. Therefore, the polymerization activity was 5,260 g/g-catalytic component·hr and 170 kg/g-Ti·hr. H.R. of the polypropylene obtained was 95.6%. Pellets and pressed plates were prepared by the same manner as in Example 1 (B).

M.F.I. of the pellets was 5.7 g/10 minutes. The stiffness of the press-formed plates of the pellets was 12,700 kg/cm$^2$ and their tensile yield strength was 325 kg/cm$^2$. Therefore, polypropylene obtained showed excellent mechanical properties.

EXAMPLE 64

After a copulverization product was prepared under the same conditions as in Example 25(A), 5.8 g of a reaction product which was obtained by reaction of 86.3 g of titanium tetrachloride, and 33.7 g of diethyl ether in 50 ml of n-heptane with stirring at room temperature was added to the copulverization product. Then, copulverization was further carried out for 1 hour. The content of the titanium atom of the copulverization product (catalytic component) thus obtained was 3.1% by weight.

Propylene was polymerized by the same procedure as in Example 25 (B), except that the catalytic component (C) used in the polymerization of propylene in Example 25 (B) was replaced by 44.5 mg of the catalytic component as described above. Consequently, 180 g of polypropylene powder was obtained. Therefore, the polymerization activity was 4,040 g/g-catalytic component·hr and 130 kg/g-Ti·hr. H.R. of the polypropylene powder was 94.5%. Pellets of the polypropylene were prepared by the same procedure in Example 1 (B). M.F.I. of the pellets was 3.8 g/10 minutes. The stiffness of press-formed plates of the pellets was 11,400 kg/cm$^2$ and their tensile yield strength was 310 kg/cm$^2$.

COMPARATIVE EXAMPLE 42

A catalytic component was prepared by the same procedure as in Example 1 (A), except that benzoyl chloride used in the copulverization in Example 1(A) was replaced by 6.0 g of ethyl benzoate and 4.6 g of silicon tetrachloride and triphenyl phosphate used in the preparation was not used. The titanium content of the copulverization product (mass) was 2.8% by weight. Propylene was polymerized by the same procedure as in Example 1 (B), except that the catalytic component used in the polymerization of propylene in Example 1(B) was replaced by 57.1 mg of the above-mentioned catalytic compound. Consequently, there was obtained 201 g of polypropylene powder. Namely, the polymerization activity was 3,520 g/g-catalytic component·hr, and 126 kg/g-Ti·hr. H.R. of the polypropylene powder was 92.7%. Pellets of the polypropylene powder and press-formed plates were formed by the same procedure as in Example 1 (B). The whiteness and transparency of the pellets were well comparable to those of the conventional polypropylene. M.F.I. of the pellets were 3.0 g/10 minutes. The stiffness of the press-formed plates was 10,800 kg/cm$^2$, and their tensile yield strength was 285 kg/cm$^2$. These showed very inferior mechanical properties.

EXAMPLE 65

Propylene was polymerized by the same procedure as in Example 25 (B), except the amount of the catalytic component (C) used in the polymerization of propylene in Example 25 (B) was changed to 44.9 mg, and ethyl benzoate used was replaced by 0.33 g of ethyl anisate. Consequently, there was obtained 304 g of polypropylene powder. Therefore, the polymerization activity was 6,770 g/g-catalytic component·hr, and 205 kg/g-Ti·hr. H.R. of the polypropylene powder was 96.4%. Pellets and press-formed plates were prepared by the same procedure as in Example 1 (B). Further, the whiteness and transparency of the pellets were well comparable to those of the conventional polypropylene. M.F.I. of the pellets was 6.4 g/10 minutes. The stiffness of the press-formed plates was 12,800 kg/cm$^2$, and their tensile yield strength was 330 kg/cm$^2$. Therefore, the polypropylene showed shown excellent mechanical properties.

EXAMPLES 66-71, COMPARATIVE EXAMPLES 43-48

Catalytic components were prepared by the same procedure as in Example 30 (A), except that the compound (a) used in the preparation of the copulverization product in Example 30 (A) was replaced by the compound (b), the compound (c), the compound (d), the compound (e), the compound (f), the compound (g), the compound (h), the compound (i) or the compound (j) (the amount was set forth in Table 9 below) (Examples 66 to 69, Comparative Examples 43 to 48). Besides catalytic components were prepared by the same procedures as in Example 38, except that the compound (a) was replaced by the compound (b) or the compound (d) (the amount was set forth in Table 9 below) (Examples 70 and 71).

Propylene was polymerized under the same condition as in Example 30 (B), except that the catalytic component (E) used at the polymerization of propylene in Example 30 (B) was replaced by the respective catalytic components thus obtained. Then, pellets of the respective polypropylene powder and press-formed plates were prepared by the similar process as in Example 1 (B). The polymerization activities, the H.R. of the polypropylene powder, the M.F.I. of the pellets and the mechanical properties of the press-formed plates are set forth in Table 9 below.

EXAMPLE 72

To 13 g of the copulverization product formed between anhydrous magnesium dichloride and benzoyl chloride employed in the preparation of the catalytic component (E) was added the reaction product of titanium tetrachloride with the compound (28). These ingredients were copulverized for 1 hour. The titanium content of the copulverization product (catalytic component) was 2.01% by weight.

Propylene was polymerized in the same manner as in Example 30 (B), except that the catalytic component (E) used in Example 30 (B) was replaced by the catalytic component thus obtained. Consequently, the polymerization activity was 3,234 g/g-catalytic component·hr, and was 161 kg/g-Ti·hr. Pellets and press-formed plates were prepared by the same procedure as in Example 1 (B). The M.F.I. of the pellets was 7.0 g/10 minutes. The stiffness of the press-formed plates was 12,200 kg/cm$^2$, and their tensile yield strength was 330 kg/cm$^2$.

COMPARATIVE EXAMPLE 49

Into the same vessel for the vibratory ball mill which was used in Example 30 (A) were placed 10 g of anhydrous magnesium dichloride, 3 g of benzoyl chloride, 1.20 g of titanium tetrachloride and 0.87 g of the diethyl sulfite (that is, equal amount of four components used in the preparation of the copulverization in Example 72) in this order. Then, these ingredients were copulverized for 8 hours.

Propylene was polymerized by the same procedure as in Example 30 (B), except that the catalytic component (E) used in the polymerization of propylene in Example 30 (B) was replaced by 177 mg of the catalytic component as described above. Consequently, 204 g of polypropylene powder was obtained. Therefore, the polymerization activity was 1,152 g/g-catalytic component·hr. and was 57 kg/g-Ti·hr. H.R. of the polypropylene was 83.7%. Pellets and press-formed plates were prepared by the same procedure as in Example 1 (B).

M.F.I. of the pellets was 7.2 g/10 minutes. The stiffness of press-formed plates of the pellets was 8,200 kg/cm$^2$ and their tensile yield strength was 240 kg/cm$^2$.

Table 9

| Example or Comparative Example No. | Compounds Kind | Compounds Amount (g) | Catalytic Components Ti Content[1] | Catalytic Components Amount (mg) | Polymerization Activities (A)[2] | Polymerization Activities (B)[3] | M F I g/10 min. | H.R. (%) | Stiffness (kg/cm$^2$) | Tensile Yield Strengths (kg/cm$^2$) |
|---|---|---|---|---|---|---|---|---|---|---|
| Example 66 | Compound b | 6.0 | 2.26 | 58.7 | 4,677 | 207 | 8.6 | 95.8 | 12.9 × 10$^3$ | 335 |
| Example 67 | Compound c | 4.0 | 2.10 | 52.5 | 3,128 | 149 | 8.2 | 94.3 | 12.2 × 10$^3$ | 316 |
| Example 68 | Compound d | 5.0 | 1.86 | 54.0 | 3,820 | 205 | 6.5 | 94.8 | 12.5 × 10$^3$ | 320 |
| Example 69 | Compound e | 8.0 | 1.96 | 54.8 | 3,491 | 178 | 7.0 | 94.5 | 12.3 × 10$^3$ | 320 |
| Example 70 | Compound b | 6.0 | 2.44 | 53.6 | 5,880 | 241 | 8.1 | 95.7 | 13.2 × 10$^3$ | 340 |
| Example 71 | Compound d | 5.0 | 2.37 | 53.1 | 4,178 | 176 | 6.3 | 94.6 | 12.0 × 10$^3$ | 323 |
| Comparative Example 43 | — | 0 | 2.01 | 50.4 | 1.234 | 61 | 13.3 | 85.0 | 8.0 × 10$^3$ | 252 |
| Comparative Example 44 | Compound f | 6.0 | 1.95 | 52.0 | 1,071 | 55 | 8.3 | 89.7 | 10.6 × 10$^3$ | 278 |
| Comparative Example 45 | Compound g | " | 2.51 | 57.1 | 1,218 | 49 | 6.8 | 88.4 | 9.8 × 10$^3$ | 264 |
| Comparative Example 46 | Compound h | " | 2.13 | 58.8 | 2,016 | 95 | 7.2 | 92.8 | 11.5 × 10$^3$ | 302 |
| Comparative Example 47 | Compound i | " | — | 56.2 | 0 | 0 | 0 | — | — | — |
| Comparative Example 48 | Compound j | " | — | 55.3 | 520 | — | 6.0 | 84.2 | 8.4 × 10$^3$ | 240 |

[1]Content of titanium atom (% by weight)
[2]g/g - Catalytic components. hr
[3]kg/g - Ti . hr

EXAMPLE 73

Propylene was polymerized by the same procedure as in Example 30 (B), except that ethyl benzoate used in the polymerization of propylene in Example 30 (B) was replaced by 0.33 g of ethyl anisate. Consequently, 224 g of polypropylene powder was obtained. Therefore, the polymerization activity was 3,822 g/g-catalytic component (A)·hr. and was 155 kg/g-Ti·hr. H.R. of the polypropylene was 95.5%. Pellets and press-formed plates were prepared by the same procedure as in Example 1 (B).

MFI of the pellets was 7.4 g/10 minutes. The stiffness of the press-formed plates of the pellets was 12,600 kg/cm$^2$, and their tensile yield strength was 330 kg/cm$^2$.

EXAMPLES 74–76, COMPARATIVE EXAMPLES 50–55

Catalytic components were prepared by the same procedure as in Example 39 (A), except that the compound (a) used in the preparation of the copulverization product in Example 39 (A) was replaced by, the compound (b), the compound (c), the compound (d), the compound (e), the compound (f), the compound (g), the compound (h), the compound (i) or the compound (j) (the amount was set forth in Table 10 below, however in Comparative Example 50 was not used the acylhalide).

Propylene was polymerized under the same conditions as in Example 39 (B), except that the catalytic component (F) used in the polymerization of propylene in Example 39 (B) was replaced by the respective catalytic components. Then, pellets of the respective polypropylene powder and press-formed plates were prepared by the same procedure as in Example 1 (B). The polymerization activities, the H.R. of the polypropylene powder, the M.F.I. of the pellets and the mechanical properties of the pressed plates are set forth in Table below.

H.R. of the obtained was 97.2%. The pellets of the polypropylene and the press-formed plates were prepared by the same process in Example 1 (B). M F I of the pellets was 6.2 g/10 minutes. The stiffness of the press-formed plates of the pellets was 13,300 kg/cm$^2$.

EXAMPLE 79

A catalytic component was prepared by the same procedure as in Example 1 (A), except that titanium tetrachloride used in the preparation of the catalytic component (A) in Example 1 (A) was replaced by 90.7 g of ethoxytitanium trichloride. Propylene was polymerized under the same conditions as in Example 1 (B) except that the catalytic component (A) used in the polymerization of propylene was replaced by 52.4 mg of the above-mentioned catalytic component. The polymerization activity was 5,420 g/g-catalytic component·hr, and 301 kg/g-Ti·hr. H.R. of the polypropylene powder was 95.4%. Pellets of the polypropylene powder were prepared under the same conditions as in Example 1 (B). M.F.I. of the pellets was 7.7 g/10 minutes.

EXAMPLE 80

A catalytic component was prepared by the same procedure as in Example 13 (A), except that titanium tetrachloride used in the preparation of the catalytic component (C) in Example 13 (A) was replaced by 90.7 g of ethoxytitanium trichloride. Propylene was polymerized under the same conditions as in Example 13 (B) except that the catalytic component (C) used in the polymerization of propylene was replaced by 45.7 mg of the above-mentioned catalytic component. The polymerization activity was 4,223 g/g-catalytic component·hr, and 212 kg/g-Ti·hr. H.R. of polypropylene powder was 95.7%. Pellets of the polypropylene powder were prepared under the same conditions as in Example 1 (B). M.F.I. of the pellets was 5.6 g/10 minutes.

EXAMPLE 81

A catalytic component was prepared by the same

Table 10

| Example or Comparative Example No. | Compounds Kind | Amount (g) | Catalytic Components Ti Content | Amount (mg) | Polymerization Activities (A)[2] | (B)[3] | M.F.I. g/10 min. | H.R. (%) | Stiffness (kg/cm$^2$) | Tensile Yield Strengths (kg/cm$^2$) |
|---|---|---|---|---|---|---|---|---|---|---|
| Example 74 | Compound b | 6.0 | 1.37 | 54.7 | 3,947 | 288 | 6.5 | 97.1 | 13.6 × 10$^3$ | 338 |
| Example 75 | Compound c | 4.0 | 1.86 | 56.2 | 3,328 | 179 | 7.2 | 95.4 | 12.8 × 10$^3$ | 324 |
| Example 76 | Compound d | 5.0 | 1.52 | 60.5 | 3,160 | 208 | 7.1 | 93.9 | 12.0 × 10$^3$ | 316 |
| Example 77 | Compound e | 8.0 | 1.46 | 58.3 | 3,229 | 221 | 4.9 | 94.7 | 12.4 × 10$^3$ | 327 |
| Comparative Example 50 | — | — | 1.38 | 57.7 | 892 | 65 | 11.8 | 84.7 | 8.9 × 10$^3$ | 251 |
| Comparative Example 51 | Compound f | 6.0 | 1.82 | 54.3 | 1,165 | 64 | 5.2 | 90.3 | 10.8 × 10$^3$ | 283 |
| Comparative Example 52 | Compound g | " | 1.54 | 56.7 | 972 | 63 | 4.6 | 89.2 | 10.1 × 10$^3$ | 278 |
| Comparative Example 53 | Compound h | " | 1.31 | 54.8 | 1,322 | 101 | 5.9 | 92.6 | 11.5 × 10$^3$ | 303 |
| Comparative Example 54 | Compound i | " | — | 55.5 | 100 | — | — | — | — | — |
| Comparative Example 55 | Compound j | " | — | 61.4 | 725 | — | 6.9 | 83.2 | 8.2 × 10$^3$ | 242 |

[1]Content of titanium atom (% by weight)
[2]g/g - Catalytic component . hr
[3]kg/g - Ti . hr

EXAMPLE 78

Propylene was polymerized by the same procedure as in Example 39 (B), except that ethyl benzoate used in the polymerization of propylene in Example 39 (B) was replaced by 0.33 g of ethyl anisate. The polymerization activity was 3,620 g/g-catalytic component·hr. The procedure as in Example 30 (A), except that titanium tetrachloride used in the preparation of the catalytic component (E) in Example 30 (A) was replaced by 90.7 g of ethoxytitanium trichloride. Propylene was polymerized under the same conditions as in Example 30

(B), except that the catalytic component (E) used in the polymerization of propylene was replaced by 46.6 mg of the above-mentioned catalytic component. The polymerization activity was 3,862 g/g-catalytic component·hr, and 182 kg/g-Ti·hr. H.R. of the polypropylene powder was 95.6%. Pellets of the polypropylene powder were prepared under the same condition as in Example 1 (B). M.F.I. of the pellets was 6.5 g/10 minutes.

EXAMPLE 82

A catalytic component was prepared by the same procedure as in Example 39 (A), except that titanium tetrachloride used in the preparation of the catalytic component (F) in Example 39 (A) was replaced by 90.7 g of ethoxytitanium trichloride. The titanium content of the catalytic component was 1.46% by weight. Propylene was polymerized under the same conditions as in Example 39 (B) except that the catalytic component (F) used in the polymerization of propylene was replaced by 59.6 mg of the above-mentioned catalytic component. The polymerization activity was 4,060 g/g-catalytic component·hr, and 278 kg/g-Ti·hr. H.R. of the polypropylene powder was 96.6%. Pellets of the polypropylene powder were prepared under the same conditions as in Example 1 (B). M.F.I. of the pellets was 5.7 g/10 minutes.

EXAMPLE 83

Ethylene was copolymerized with propylene under the same conditions as in Example 1 (B) except that the amount of the catalytic component (A) used on the polymerization in Example 1 (B) was changed to 53.3 mg, and in the polymerization, 12.0 g of ethylene was used together. Consequently, there was obtained 336 g of a powdery copolymer of ethylene and propylene with an ethylene content of 3.5% by weight. Namely, the polymerization activity was 6,304 g/g-catalytic component (A)·hr, and 447 kg/g-Ti·hr. The residue after extraction with boiling n-butyl alcohol was 98.0%.

EXAMPLE 84

Ethylene was copolymerized with propylene under the same conditions as in Example 13 (B) except that the amount of the catalytic component (B) used in the polymerization in Example 13 (B) was changed to 48.3 mg, and in the polymerization, 10.0 g of ethylene was used together. Consequently, there was obtained 247 g of a powdery copolymer of ethylene and propylene with an ethylene content of 3.8% by weight. Namely, the polymerization activity was 4,960 g/g-catalytic component (B)·hr, and 210 kg/g-Ti·hr. The residue after extraction with boiling n-butyl alcohol was 97.9%.

EXAMPLE 85

Ethylene was copolymerized with propylene under the same conditions as in Example 25 (B) except that the amount of the catalytic component (C) used in the polymerization in Example 25 (B) was changed to 48.3 mg, and in the polymerization, 12.0 g of ethylene was used together. Consequently, there was obtained 321 g of a powdery copolymer of ethylene and propylene with an ethylene content of 3.4% by weight. Namely, the polymerization activity was 6,650 g/g-catalytic component (C)·hr, and 201 kg/g-Ti·hr. The residue after extraction with boiling n-butyl alcohol was 98.3%.

EXAMPLE 86

Ethylene was copolymerized with propylene under the same conditions as in Example 30 (B) except that the amount of the catalytic component (E) used in the polymerization in Example 30 (B) was changed to 50.7 mg, and in the polymerization 8.7 g of ethylene was used together. Consequently, there was 230 g of a powdery copolymer of ethylene and propylene with an ethylene content of 3.5% by weight. Namely, the polymerization activity was 4,545 g/g-catalytic component (E)·hr, and 185 kg/g-Ti·hr. The residue after extraction with boiling n-butyl alcohol was 98.0%.

EXAMPLE 87

Ethylene was copolymerized with propylene under the same conditions as in Example 39 (B) except that the amount of the catalytic component (F) used in the polymerization in Example 39 (B) was changed to 52.5 mg, and that in the polymerization, 8.0 g of ethylene was used togehter. Consequently, there was 196 g of a powdery copolymer of ethylene and propylene with an ethylene content of 3.4% by weight. Namely, the polymerization activity was 3,740 g/g-catalytic component (F)·hr, and 367 kg/g-Ti·hr. The residue after extraction with boiling n-butyl alcohol was 98.1%.

Propylene was polymerized under the same conditions as in Example 1, (B) using the catalyst systems obtained in Examples 1 and 5, Comparative Examples 18 and 42, and Reference Example 1 (composed of 0.20 g of AA type titanium trichloride and 0.58 g of diethylaluminum chloride) except that the amount of hydrogen used was changed as shown in Table 11. The H.R. values of the resulting polypropylene powders, and the M.F.I. values of pellets prepared from the polypropylene powders under the same conditions as in Example 1 are shown in Table 11.

Table 11

Figure 4:
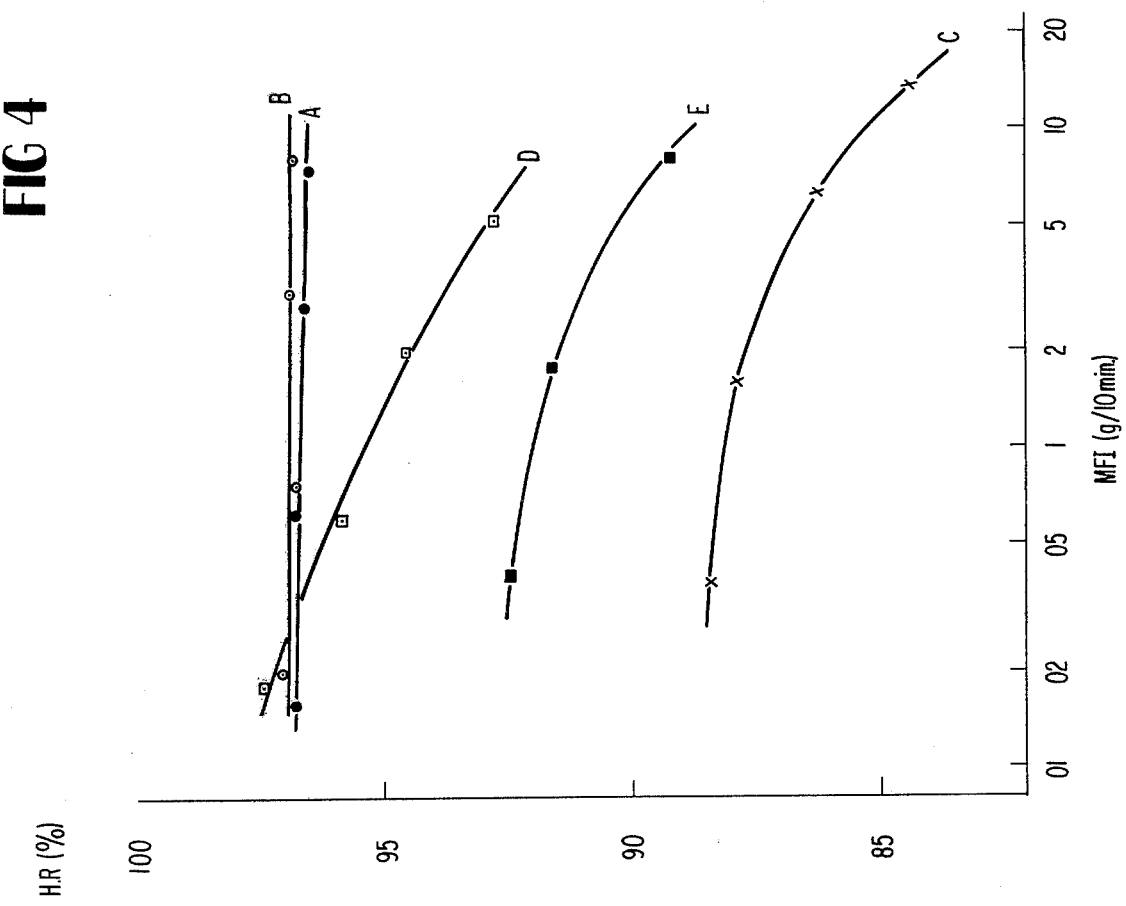
FIG. 4 is a diagram showing the relation of the MFI values (g/10 min., on the axis of the abscissas) and the HR values (%, on the axis of ordinates) of polypropylene powders prepared in Examples 1 and 5, Comparative Examples 18 and 42 and Reference Example 1 (shown in Table 11)

| Symbol in FIG. 4 | Catalyst System | Amount of Hydrogen used (g) | H. R. (%) | M. F. I. (g/10 min) |
|---|---|---|---|---|
| (A) | Example 1 | 0.07 | 96.4 | 7.6 |
|  |  | 0.03 | 96.5 | 2.8 |
|  |  | 0.012 | 96.7 | 0.63 |
|  |  | 0 | 96.7 | 0.16 |
| (B) | Example 5 | 0.07 | 96.7 | 8.2 |
|  |  | 0.03 | 96.8 | 3.1 |
|  |  | 0.012 | 96.7 | 0.77 |
|  |  | 0 | 97.0 | 0.20 |
| (C) | Comparative Example 18 | 0.07 | 84.2 | 13.6 |
|  |  | 0.03 | 86.1 | 6.3 |
|  |  | 0.012 | 87.8 | 1.6 |
|  |  | 0 | 88.4 | 0.38 |
| (D) | Comparative Example 42 | 0.07 | 92.7 | 5.2 |
|  |  | 0.03 | 94.5 | 2.0 |
|  |  | 0.012 | 95.8 | 0.60 |
|  |  | 0 | 97.4 | 0.18 |
| (E) | Reference Example 1 | 0.12 | 89.1 | 8.2 |
|  |  | 0.07 | 91.5 | 1.8 |
|  |  | 0.03 | 92.4 | 0.40 |

The relation between H.R. of each of the polypropylene powders obtained by each of the catalyst system shown in Table 11, and the M.F.I. of pellets is shown in FIG. 4.

Propylene was polymerized under the same conditions as described in Example 13, Example 19, Comparative Example 25 and Comparative Example 42 except that the amount of hydrogen used was changed as shown in Table 12. The H.R. values of the polypropylene powder and the M.F.I. values of pellets prepared under the same conditions as in Example 1 are shown in Table 12.

Table 12

Figure 5:
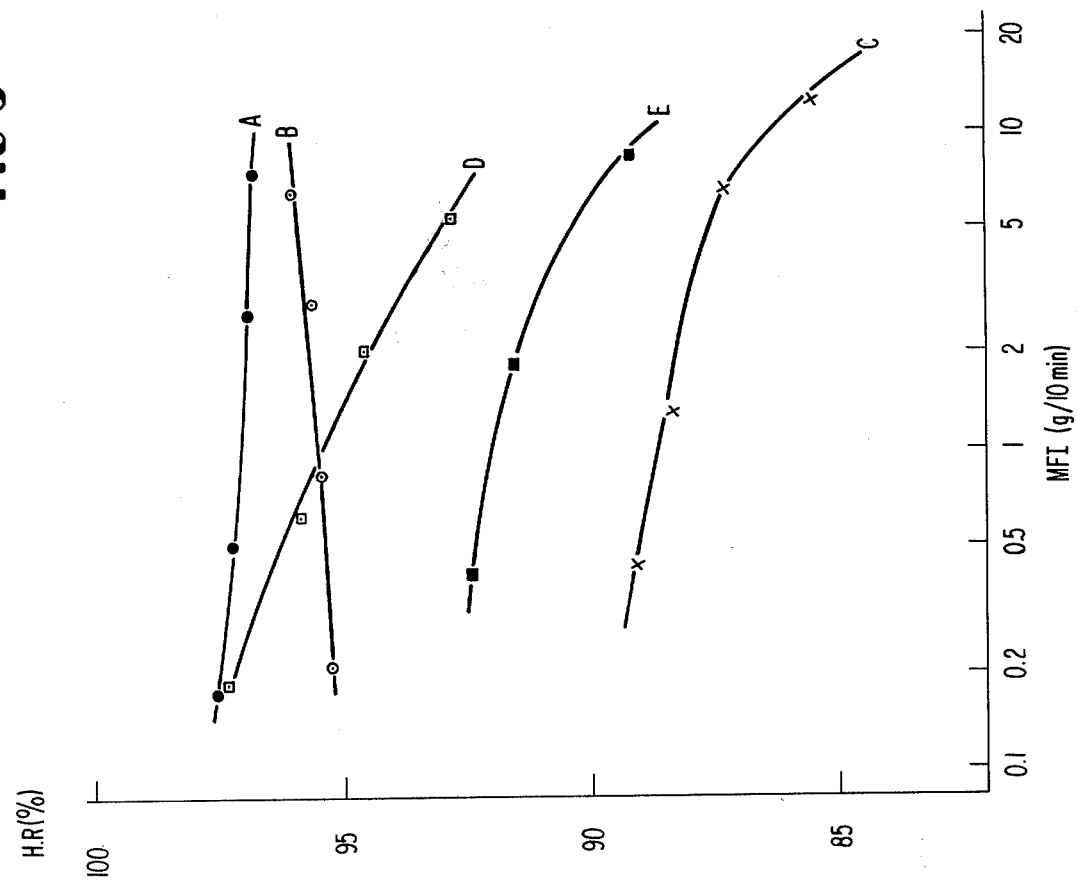
FIG. 5 is a diagram showing the relation between the MFI values (g/10 min., on the axis of the abscissas) and the HR values (%, on the axis of ordinates) of polypropylene powders prepared in Examples 13 and 19, Comparative Examples 25 and 42 and Reference Example 1 (shown in Table 12)

| Symbols in FIG. 5 | Run No. | Catalyst System | Amount of Hydrogen Used (g) | H. R. (%) | M. F. I. (g/10 min) |
|---|---|---|---|---|---|
| (A) | 1[1] | Example 13 | 0.07 | 96.6 | 7.3 |
|  | 2 |  | 0.03 | 96.8 | 2.6 |
|  | 3 |  | 0.012 | 97.3 | 0.51 |
|  | 4 |  | 0 | 97.5 |  |
| (B) | 5[2] | Example 19 | 0.07 | 95.9 | 6.3 |
|  | 6 |  | 0.03 | 95.5 | 2.8 |
|  | 7 |  | 0.012 | 95.4 | 0.84 |
|  | 8 |  | 0 | 95.2 | 0.21 |
| (C) | 9[3] | Comparative Example 25 | 0.07 | 85.4 | 12.1 |
|  | 10 |  | 0.03 | 87.2 | 6.4 |
|  | 11 |  | 0.012 | 88.3 | 1.3 |
|  | 12 |  | 0 | 89.1 | 0.43 |
| (D) | 13[4] | Comparative Example 42 | 0.07 | 92.7 | 5.2 |
|  | 14 |  | 0.03 | 94.5 | 2.0 |
|  | 15 |  | 0.012 | 95.8 | 0.60 |
|  | 16 |  | 0 | 97.4 | 0.18 |

[1]Example 13
[2]Example 19
[3]Comparative Example 25
[4]Comparative Example 42

The relations between the H.R. value of each polypropylene powder obtained by the catalyst systems (shown in Table 12) and the M.F.I. value of the pellets are shown in FIG. 5.

Propylene was polymerized under the same conditions as in Example 25, (B) using the catalyst systems obtained in Examples 25 and 27 and Comparative Examples 8, 16 and 42 respectively except that the amount of hydrogen used was varied as shown in Table 13. The H.R. values of the resulting polypropylene powders and the M.F.I. values of pellets prepared from these polypropylene powders under the same conditions as in Example 1 are shown in Table 13.

Table 13

Figure 6:
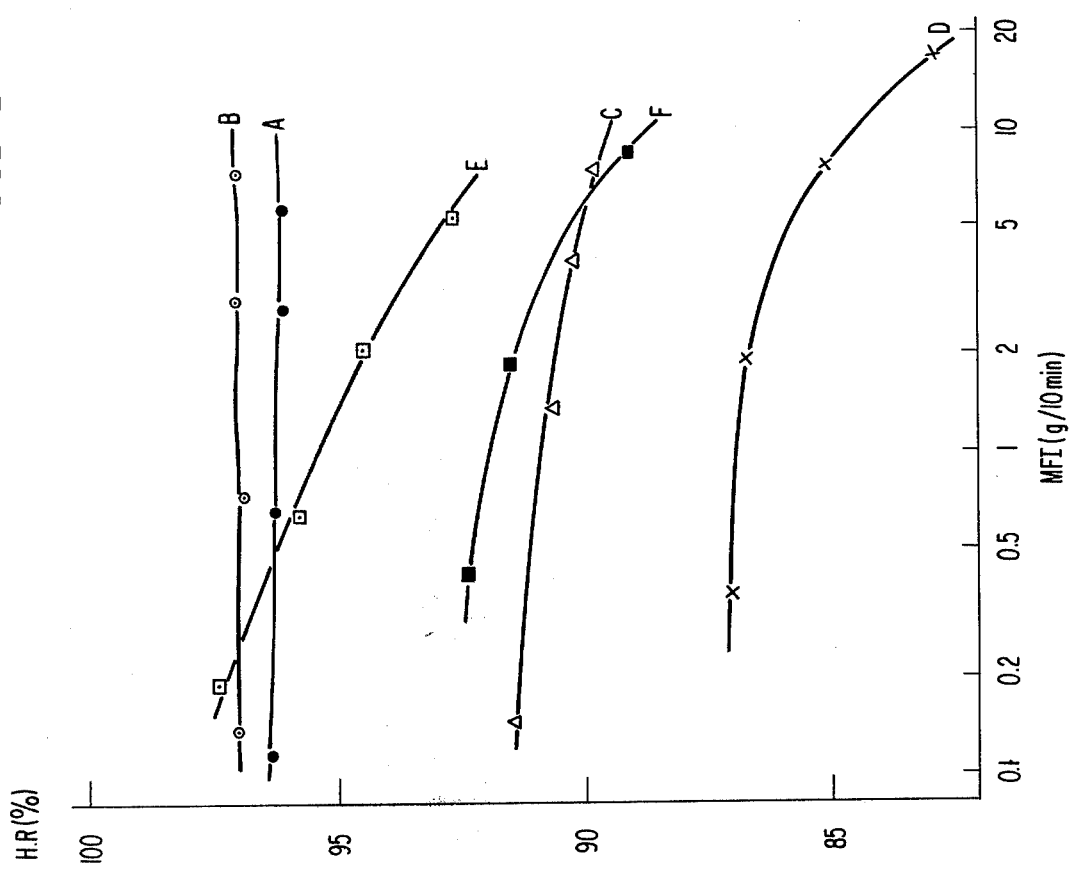
FIG. 6 is a diagram showing the relation between the MFI values (g/10 min., on the axis of the abscissas) and the HR values (%, on the axis of ordinates) of polypropylene powders prepared in Examples 25 and 27, Comparative Examples 8, 16 and 42 and Reference Example 1 (shown in Table 13)

| Symbols in FIG. 6 | Catalyst System | Amount of Hydrogen Used (g) | H. R. (%) | M. F. I. (g/10 min) |
|---|---|---|---|---|
|  | Example 25 | 0.07 | 96.1 | 5.6 |
|  |  | 0.03 | 96.1 | 2.7 |
| (A) |  | 0.012 | 96.3 | 0.63 |
|  |  | 0 | 96.4 | 0.11 |
|  | Example 27 | 0.07 | 97.0 | 7.3 |
|  |  | 0.03 | 97.1 | 2.9 |
| (B) |  | 0.012 | 96.9 | 0.70 |
|  |  | 0 | 97.0 | 0.13 |
|  | Comparative Example 8 | 0.07 | 89.8 | 7.3 |
|  |  | 0.03 | 90.2 | 3.8 |
| (C) |  | 0.012 | 91.3 | 1.3 |
|  |  | 0 | 92.4 | 0.14 |
|  | Comparative Example 16 | 0.07 | 83.2 | 15.0 |
| (D) |  | 0.03 | 85.1 | 7.6 |
|  |  | 0.012 | 86.7 | 1.9 |
|  |  | 0 | 87.0 | 0.35 |
|  | Comparative Example 42 | 0.07 | 92.7 | 5.2 |
|  |  | 0.03 | 94.5 | 2.0 |
| (E) |  | 0.012 | 95.8 | 0.60 |
|  |  | 0 | 97.4 | 0.18 |

The relations between the H.R. value of each of the polypropylene powders obtained by the catalyst systems shown in Table 13 and the M.F.I. value of pellets are shown in FIG. 6.

Propylene was polymerized under the same conditions as in Example 30, (B) using the catalyst systems obtained in Examples 30 and 35 and Comparative Examples 43 and 42 respectively except that the amount of hydrogen used was changed as shown in Table 14. The H. R. values of the resulting polypropylene powders and the M.F.I. values of the pellets prepared from these polypropylene powders under the same conditions as in Example 1 are shown in Table 14.

Table 14

Figure 7:
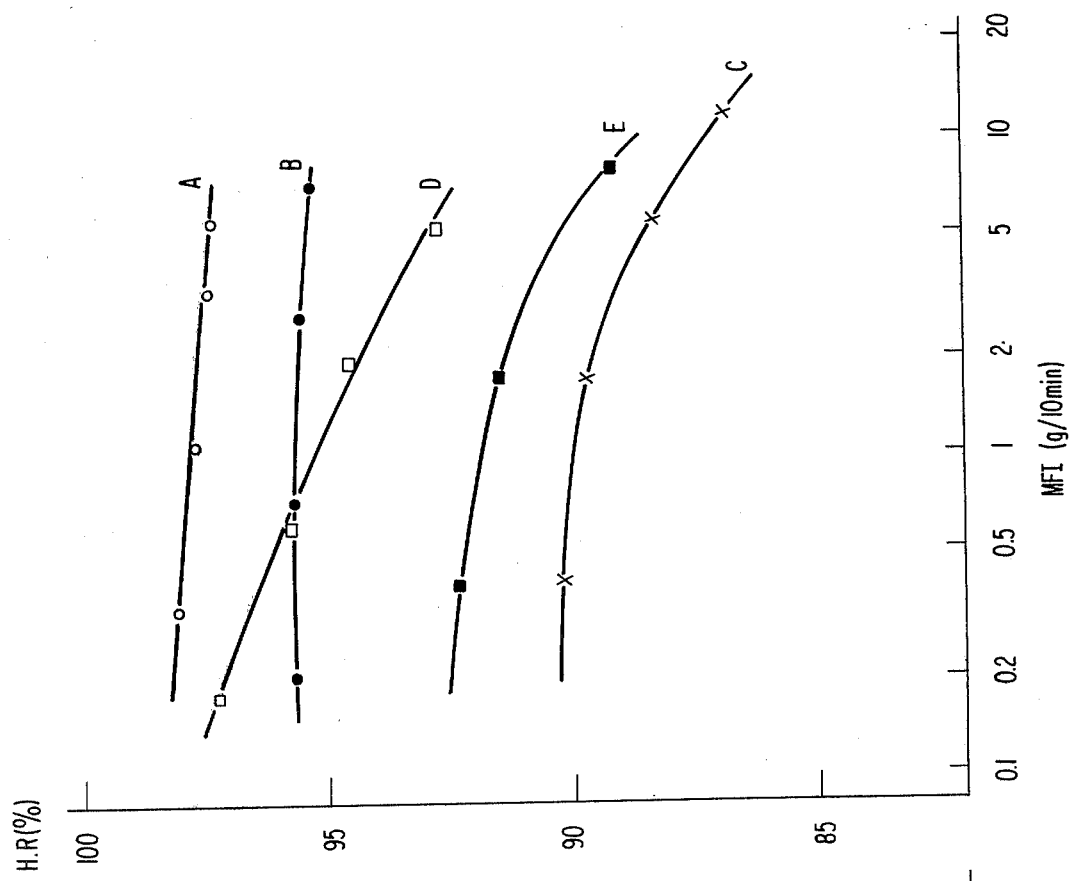
FIG. 7 is a diagram showing the relation between the MFI values (g/10 min., on the axis of the abscissas) and the HR values (%, on the axis of ordinates) of polypropylene powders prepared in Examples 30 and 35, Comparative Examples 43 and 42 and Reference Example 1 shown (in Table 14)

| Symbols in FIG. 7 | Run No. | Catalyst System | Amount of Hydrogen Used (g) | H. R. (%) | M. F. I. (g/10 min) |
|---|---|---|---|---|---|
| (A) | 1[1] | Example 30 | 0.07 | 96.1 | 8.4 |
|  | 2 |  | 0.03 | 96.4 | 2.9 |
|  | 3 |  | 0.012 | 96.6 | 0.40 |
|  | 4 |  | 0 | 96.7 | 0.13 |
| (B) | >5[2] | Example 35 | 0.07 | 95.9 | 7.9 |
|  | 6 |  | 0.03 | 96.2 | 3.1 |
|  | 7 |  | 0.012 | 96.2 | 0.92 |
|  | 8 |  | 0 | 96.7 | 0.18 |
|  | 9[3] | Comparative Example 43 | 0.07 | 85.0 | 13.3 |
| (C) | 10 |  | 0.03 | 86.2 | 7.1 |
|  | 11 |  | 0.012 | 87.8 | 1.7 |
|  | 12 |  | 0 | 89.4 | 0.57 |
|  | 13[4] | Comparative Example 42 | 0.07 | 92.7 | 5.2 |
| (D) | 14 |  | 0.03 | 94.5 | 2.0 |
|  | 15 |  | 0.012 | 95.8 | 0.60 |
|  | 16 |  | 0 | 97.4 | 0.18 |

[1]Example 30
[2]Example 35
[3]Comparative Example 43
[4]Comparative Example 42

The relations between the H.R. value of each of the polypropylene powders obtained by the catalyst systems shown in Table 14 and the M.F.I. of pellets are shown in FIG. 7.

Propylene was polymerized in the same way as in Example 39, (B) using the catalyst systems obtained in Examples 39 and 42 and Comparative Examples 50 and 42 except that the amount of hydrogen used was changed as shown in Table 15. The H.R. values of the resulting polypropylene powders and the M.F.I. values of the pellets prepared under the same conditions as in Example 1 from polypropylene powders are shown in Table 15.

Table 15

Figure 8:
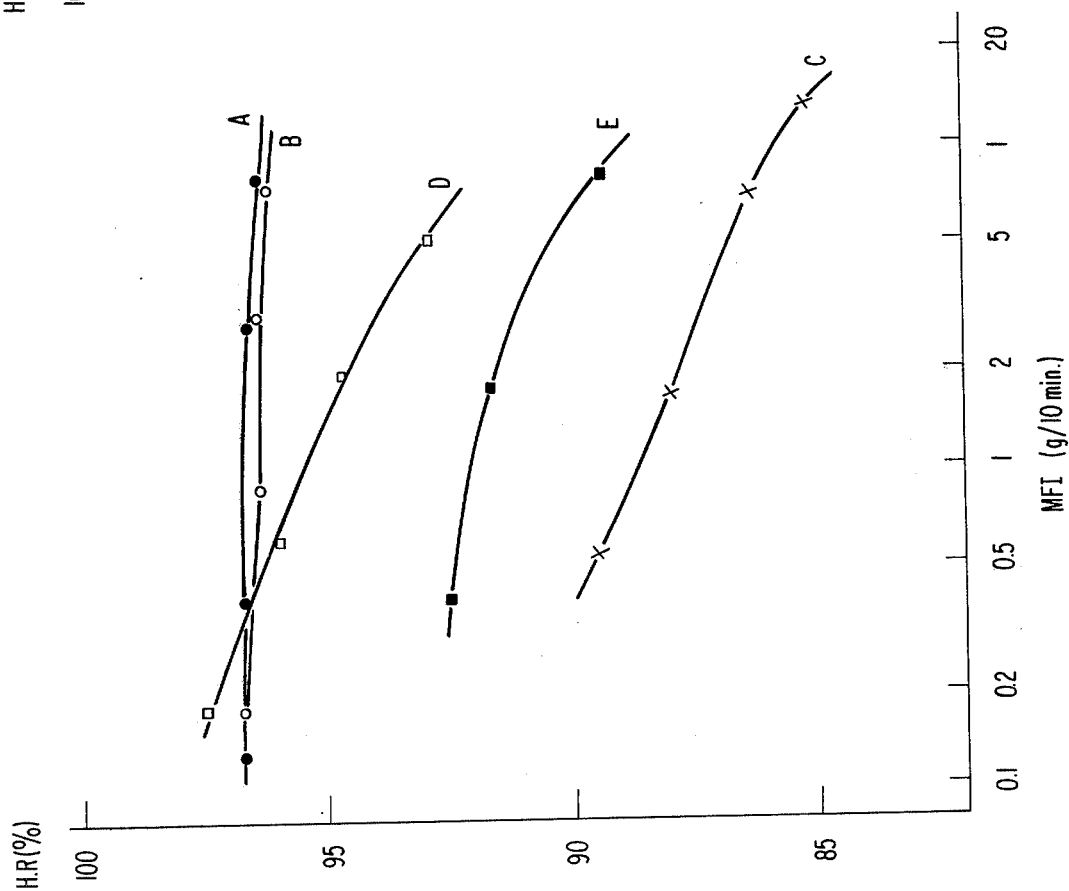
FIG. 8 is a diagram showing the relation between the MFI values (g/10 min., on the axis of the abscissas) and the HR values (%, on the axis of ordinates) of polypropylene powders prepared in Examples 39 and 42, Comparative Examples 50 and 42 and Reference Example 1 (shown in Table 15).

| Symbols in FIG. 8 | Run No. | Catalyst System | Amount of Hydrogen Used (g) | H. R. (%) | M. F. I. (g/10 min) |
|---|---|---|---|---|---|
| (A) | 1 | Example 39 | 0.07 | 97.4 | 5.6 |
|  | 2 |  | 0.08 | 97.5 | 3.4 |
|  | 3 |  | 0.012 | 97.8 | 1.1 |
|  | 4 |  | 0 | 98.2 | 0.33 |
| (B) | 5 | Example 42 | 0.07 | 95.3 | 7.2 |
|  | 6 |  | 0.03 | 95.6 | 2.8 |
|  | 7 |  | 0.012 | 95.8 | 0.72 |
|  | 8 |  | 0 | 95.8 | 0.21 |
| (C) | 9 | Comparative Example 50 | 0.07 | 86.8 | 12.2 |
|  | 10 |  | 0.03 | 88.3 | 5.6 |
|  | 11 |  | 0.012 | 89.8 | 1.8 |
|  | 12 |  | 0 | 90.3 | 0.41 |
| (D) | 13 | Comparative Example 42 | 0.07 | 92.7 | 5.2 |
|  | 14 |  | 0.03 | 94.5 | 2.0 |
|  | 15 |  | 0.012 | 95.8 | 0.60 |
|  | 16 |  | 0 | 97.4 | 0.18 |

The relations between the H.R. value of each of the polypropylene powders obtained with the catalyst systems (shown in Table 11) and the M.F.I. value of pellets are shown in FIG. 8.

It is seen from FIG. 4 to 8 that when propylene is polymerized by the catalyst system of the present invention, the H.R. value of the resulting polypropylene scarcely changes even if the M.F.I. value of the pellets of the polypropylene is increased, whereas when propylene is polymerized with the catalyst systems used in Comparative Examples and Referential Examples, the H.R. value of the polypropylene decreases drastically if the M.F.I. of the pellets is increased.

EXAMPLE 88

(A) Preparation of a carrier

Commercially available anhydrous magnesium chloride was dried by heating at about 500° C. for 6 hours under a stream of nitrogen. The resulting magnesium chloride (25.0 g) and 7.5 g of benzoyl chloride were placed in a 1-liter vibratory ball mill pot (packed with 600 ml of porcelain balls with a diameter of about 10 mm), and copulverized for 8 hours with an amplitude of 8 mm and a vibrating cycle of 30 Hz to obtain a pale brown gray powdery carrier. The infrared absorption spectrum of the carrier showed a new broad and high absorption having a peak at a wave number of 1685 cm$^{-1}$. (see FIG. 2[D])

(B) Preparation of a catalyst component 8 g of the carrier prepared in (A) was placed in a 500 ml flask, and a solution obtained by reacting 8 g of titanium tetrachloride with 2.4 g of triphenyl phosphite in 20 ml of toluene was added. The ingredients were mixed with stirring at 60° C. for 30 minutes. The resulting solid component was separated by filtration, and washed with 50 ml of toluene three times. After washing, the filtrate was dried at room temperature under reduced pressure to afford a yellow-brown powdery catalyst component (G). A chemical analysis of this catalyst component showed that it contained 21 mg of titanium atom per 1 g.

(C) Polymerization of propylene

Into a 1.5 l stainless steel autoclave whose inside atmosphere had been replaced by dry nitrogen gas were placed 2.0 mmol of triethyl aluminum, 0.6 mmol of ethyl benzoate and 18.0 mg of the catalyst component (G). Then, 360 g of propylene and 600 ml (under NTP). of hydrogen were added. The polymerization system was heated to 70° C. The polymerization was continued for 60 minutes at this temperature. The gas present in the autoclave was released and the polymerization was terminated to afford 192 g of polypropylene powder. The polymerization activity was 10670 g/g-catalyst component (G)·hr and 507 kg/g-Ti·hr. H.R. of the polypropylene obtained was 96.2%. MFI of the polypropylene was measured by the same procedure as in Example 1(B) and was 7.2 g/10 minutes.

EXAMPLE 89–91

Copulverization was performed in the same way as in Example 88 except that the pulverization time for the production of a carrier in Example 88 was changed to 2, 4, and 16 hours, respectively. The copulverization conditions are shown in Table 16. The infrared absorption spectra of the resulting copulverized products (carriers) are shown in (B), (C) and (E) in FIG. 2.

Table 16

| Example No. | Acyl Halide Compound Kind | Acyl Halide Compound Amount (g) | Time of Copulverization (hr) |
|---|---|---|---|
| 89 | Compound (a) | 7.5 | 2 |
| 90 | " | " | 4 |
| 91 | " | " | 16 |

COMPARATIVE EXAMPLE 56

Copulverization was performed in the same way as in Example 88 (A) except that only 25.0 g of magnesium chloride was used without adding benzoyl chloride which was used in the production of the carrier in Example 88 (A). The thus obtained carrier was a white-gray powder, and the infrared absorption spectrum of the carrier showed no absorption in a region of 1670 to 1720 cm$^{-1}$.

Then the same procedure as in Example 88 (B) was followed except that the above-described carrier was used to prepare a catalyst component. The catalyst component had a titanium atom content of 1.74% by weight and to be brown in color.

Further, the polymerization of propylene was performed in the same way as in Example 88 (C) except that 16.8 mg of the catalyst component was used in place of the catalyst component obtained in Example 88 (B). As a result, 32,7 g powdery polypropylene was obtained. The polymerization activity was 1950 g/g-carrier-supported catalyst·hr and 112 kg/g-Ti·hr. H.R. and MFI of the polypropylene powder were 84.2% and 6.1 g/10 minutes, respectively.

COMPARATIVE EXAMPLE 57–59

The same anhydrous magnesium chloride (25.0 g) as used in Example 1 and benzoyl chloride were reacted in 100 ml of kerosene as an inert organic solvent under the conditions shown in Table 17-1. The colors of the resulting carriers are shown in Table 17-1. The ratio of compounds in Table 17-1 means the weight ratio of benzoyl chloride to anhydrous magnesium chloride.

Each of the reaction products obtained in Comparative Example 57 to 59 was washed four times with 400 ml of heptane, and then completely dried to form a carrier. The carriers were each analyzed by infrared absorption spectroscopy. The spectra of the carrier in Comparative Example 57 are shown in (G) of FIG. 3. The spectra of the carrier in Comparative Example 58 are shown in (H) of FIG. 3. The spectra of the carrier in Comparative Example 59 are shown in (I) of FIG. 3. It is seen from FIG. 3 that the carriers obtained by the reaction have no absorption peak at 1670 to 1720 cm$^{-1}$.

A catalyst component was prepared in the same way as in Example 88 (B) except that each of these carriers was used instead of the carrier used in Example 88 (B). Propylene was polymerized under the same conditions as in Example 88 (C) except that each of the catalyst component was used in the amounts indicated in Table 17-1 instead of the catalyst component used in Example 88 (C). The polymerization activities of the carrier-supported catalysts and the H.R. of the polypropylenes obtained are shown in Table 17-2.

Table 17-1

| Comparative Example No. | Ratio of compound | Reaction Temperature (°C.) | Reaction Time (hr) | Color |
|---|---|---|---|---|
| 57 | 0.3 | 60 | 1.5 | Pink |
| 58 | 1.5 | 100 | 4 | Yellow |

Table 17-1-continued

| Comparative Example No. | Ratio of compound | Reaction Temperature (°C.) | Reaction Time (hr) | Color |
|---|---|---|---|---|
| 59 | 15.0 | 150 | 4 | Pale brown |

Table 17-2

| Comparative Example No. | Amount used (mg) | Polymerization Activity[1] | H.R. (%) |
|---|---|---|---|
| 57 | 46.2 | 663 | 86.1 |
| 58 | 43.5 | 925 | 79.3 |
| 59 | 41.7 | 721 | 84.4 |

[1] g/g-catalyst component. hour

While the invention has been described in detail and with reference to specific embodiments thereof, it will be apparent to one skilled in the art that various changes and modifications can be made therein without departing from the spirit and scope thereof.

What we claim is:

1. A process for polymerizing or copolymerizing propylene in the presence of a catalyst consisting essentially of
   (A) a solid catalyst component prepared by contacting
      (1) a copulverized material obtained by copulverizing a magnesium dihalide together with an aromatic acyl halide with
      (2) a mixture or addition-reaction product of a tetravalent titanium compound containing at least one halogen atom with at least one electron donor compound selected from the group consisting of organic compounds containing a P—O bond, organic compounds containing an Si—O bond, ether compounds, nitrite ester compounds, sulfite ester compounds, alcohol compounds, phenol compounds and naphthol compounds,
   (B) a trialkyl aluminum compound, and
   (C) an aromatic carboxylic acid ester compound, where the amount of the aromatic acyl halide is 0.01 to 2 moles per mole of the magnesium dihalide, the amount of the titanium compound is 0.1 to 50 moles per mole of the electron donor compound, the amount of the aforesaid mixture or addition-reaction product (as titanium atoms) is 0.001 to 1 mole per mole of the trialkyl aluminum compound and the amount of the aromatic carboxylic acid ester compound is 0.02 to 1 mole per mole of the trialkyl aluminum compound.

2. The process of claim 1, wherein said polymerizing or copolymerizing is carried out at a temperature of from −10° to 200° C.

3. The process of claim 1, wherein said polymerizing or copolymerizing is carried out at a pressure of from atmospheric pressure to 100 atms.

4. The process of claim 1, wherein said copulverized material is copulverized to the extent tht an infrared absorption peak at 1783 cm$^{-1}$ attributed to a carbonyl group shifts to 1685 cm$^{-1}$, with the ratio of the absorption peak at 1685 cm$^{-1}$/1783 cm$^{-1}$ increasing with the duration of the copulverizing.

5. The process of claim 1, wherein said copulverizing is carried out using a ball mill, vibratory ball mill, impact pulverizer or colloid mill at room temperature for 30 minutes to 16 hours.

6. The process of claim 1, wherein said magnesium dihalide is magnesium dichloride.

7. The process of claim 1, wherein said aromatic acyl halide is a compound represented by general formula (I)

$$R^1-\overset{\overset{O}{\|}}{C}-X \quad (I)$$

wherein $R^1$ represents a hydrocarbon radical having at most 20 carbon atoms selected from the group consisting of aryl radicals, aralkyl radicals and derivatives of said hydrocarbon radicals substituted with at most 3 halogen atoms or alkoxy radicals having at most 20 carbons, and X is a halogen atom.

8. The process of claim 7, wherein said aromatic acyl halide is benzoyl chloride, benzoyl bromide or toluoyl chloride.

9. The process of claim 1, wherein said tetravalent titanium compound is a compound represented by general formula (II)

$$TiX^2{}_n(OR^2)_m(NR^3R^4)_l(OCOR^5)_p \quad (II)$$

wherein $X^2$ is a chlorine, bromine or iodine atom, $R^2$, $R^3$, $R^4$ and $R^5$ are the same or different and represent a hydrocarbon radical having at most 12 carbon atoms selected from the group consisting of alkyl radicals, alkenyl radicals, cycloalkyl radicals, aryl radicals and aralkyl radicals, n is a number of 1 to 4, each of m, l and p is 0 to 3 and n+m+l+p is 4.

10. The process of claim 9, wherein said tetravalent titanium compound is titanium tetrachloride, methoxytitanium trichloride or ethoxytitanium trichloride.

11. The process of claim 1, wherein said organic compounds containing a P—O bond are compounds represented by general formula (III) or (IV)

$$X^3{}_lY_mP(OR^6)_n \quad (III)$$

$$X^4{}_qY_rP(O)(OR^7)_s \quad (IV)$$

wherein the sum of l, m and n and the sum of q, r and s is 3, $0 \leq l$, $m < 3$, $0 < n \leq 3$, $R^6$ and $R^7$ are the same or different and represent a hydrocarbon radical having at most 20 carbon atoms selected from the group consisting of alkyl radicals, alkenyl radicals, cycloalkyl radicals, cycloalkenyl radicals, aryl radicals and aralkyl radicals and derivatives of said hydrocarbon radicals substituted with at most 3 halogen atoms or alkoxy radicals or aryloxy radicals having at most 20 carbon atoms, $X^3$, $X^4$ and Y are the same or different and represent a hydrogen atom, a halogen atom, a hydroxy group or said hydrocarbon radical or said substituted hydrocarbon radicals.

12. The process of claim 11, wherein said organic compound containing a P—O bond is triphenylphosphate, triethylphosphite, triphenylphosphite, diphenylphosphorochloridate, tris (2-chloroethyl) phosphite, tris (2-chloroethyl) phosphate, tris (2-butoxyethyl) phosphate, triethylphosphate, di-n-butylphosphate or diethylphosphite.

13. The process of claim 1, wherein said organic compounds containing an Si—O bond are a compound represented by general formula (V), (V) or (VII)

$$Si(OR^8)_mR^9{}_n \quad (V)$$

$$R^{10}(R_1^{11}SiO)_lSiR_3^{12} \quad (VI)$$

$$R_2^{13}SiO)_p \quad (VII)$$

wherein $R^8$, $R^9$ and $R^{13}$ are the same or different and represent a hydrocarbon radical having at most 20 carbon atoms selected from the group consisting of alkyl radicals, alkenyl radicals, cycloalkyl radicals, cycloalkenyl radicals, aryl radicals and aralkyl radicals and derivatives of said hydrocarbon radicals substituted with at most 3 halogen atoms or alkoxy radicals having at most 20 carbon atoms, wherein $R^9$ can further represent a hydrogen atom or halogen atom; $R^{10}$, $R^{11}$ and $R^{12}$ are the same or different and represent the abovesaid hydrocarbon radicals, said substituted derivatives thereof or a halogen atom, m+n is 4, with the proviso that m is not 0, l is an integer of from 1 to 1000, and p is an integer of from 2 to 1000.

14. The process of claim 13, wherein said organic compound containing an Si—O bond is dimethyl dimethoxysilane, tetraethoxysilane, tetramethoxysilane, hexamethyldisiloxane, dimethylpolysiloxane, 1,3-dichlorotetramethyldisiloxane, 3-hydroheptamethyltrisiloxane, methylhydropolysiloxane, triethoxychlorosilane, or hexamethylcyclotrisiloxane.

15. The process of claim 1, wherein said ether compounds are linear or cyclic ether compounds which have at most 40 carbon atoms, and comprise hydrocarbon radicals selected from the group consisting of aliphatic hydrocarbon radicals, cycloaliphatic hydrocarbon radicals and aromatic hydrocarbon radicals and derivatives of said hydrocarbon radicals substituted with at most 3 halogen atoms.

16. The process of claim 15, wherein said ether compound is diethyl ether, anisole, di-n-butyl ether or diphenyl ether.

17. The process of claim 1, wherein said nitrite ester compounds have a hydrocarbon radical(s) having at most 8 carbon atoms selected from the group consisting of alkyl radicals, cycloalkyl radicals, aryl radicals and aralkyl radicals.

18. The process of claim 17, wherein said nitrite ester compound is n-butyl nitrite or isoamyl nitrite.

19. The process of claim 1, wherein said sulfite ester compounds have a hydrocarbon radical(s) having at most 8 carbon atoms selected from the group consisting of aralkyl radicals, cycoalkyl radicals, aryl radicals and aralkyl radicals.

20. The process of claim 19, wherein said sulfite ester compound is diethyl sulfite or dimethyl sulfite.

21. The process of claim 1, wherein said alcohol compounds are monohydroxyl or polyhydroxyl compounds which have 2 to 20 carbon atoms and hydrocarbon radicals selected from the group consisting of alkyl radicals, cycloalkyl radicals and aralkyl radicals and derivatives of these hydrocarbon radicals substituted with at most 3 halogen atoms and/or alkoxy radicals.

22. The process of claim 21, wherein said alcohol compound is ethyl alcohol, propylene glycol, n-butyl alcohol, cyclohexanol, stearyl alcohol or tert-butyl alcohol.

23. The process of claim 1, wherein said phenol compounds have at most 20 carbon atoms or a derivative thereof substituted with at most 3 alkyl radicals, alkoxy radicals and/or halogen atoms.

24. The process of claim 23, wherein said phenol compound is m-cresol.

25. The process of claim 1, wherein said naphthol compounds have at most 20 carbon atoms or a derivative thereof substituted with at most 3 alkyl radicals, alkoxy radicals and/or halogen atoms.

26. The process of claim 1, wherein said process comprises controlling the molecular weight of the resulting polymers or copolymers without any decrease in the H.R. thereof.

27. The process of claim 1, wherein the product of the process is obtained by evaporating and drying without the necessity for the removal of low crystalline product.

28. The process of claim 1, wherein the infrared absorption spectrum of the carrier obtained by co-pulverizing the magnesium halide and the aromatic acyl halide exhibits an absorption based at 1685 cm$^{-1}$, the ratio of the absorbance thereof at 1685 cm$^{-1}$ to the absorbance thereof at 1783 cm$^{-1}$ increasing with the duration of co-pulverizing.

29. The process of claim 1, wherein the titanium compound and the electron donor are simultaneously contacted with the copulverized material.

30. The process of claim 1, wherein the copulverized material is added to the addition reaction product of the tetravalent titanium compound and electron donor compound.

* * * * *